(12) United States Patent
Kessler et al.

(10) Patent No.: US 7,876,544 B2
(45) Date of Patent: Jan. 25, 2011

(54) ELECTRICAL CIRCUIT WITH INCENDIVE ARC PREVENTION MEANS

(75) Inventors: Michael Kessler, Mannheim (DE);
Gunther Rogoll, Mannheim (DE);
Martin Junker, Mannheim (DE);
Renato Kitchener, West Sussex (GB)

(73) Assignee: Pepperl + Fuchs GmbH (DE)

( * ) Notice: Subject to any disclaimer, the term of this patent is extended or adjusted under 35 U.S.C. 154(b) by 952 days.

(21) Appl. No.: 11/631,460

(22) PCT Filed: Jul. 5, 2005

(86) PCT No.: PCT/GB2005/002638

§ 371 (c)(1),
(2), (4) Date: Jan. 3, 2007

(87) PCT Pub. No.: WO2006/003445

PCT Pub. Date: Jan. 12, 2006

(65) Prior Publication Data

US 2008/0304196 A1    Dec. 11, 2008

(30) Foreign Application Priority Data

| Jul. 5, 2004 | (GB) | ................................ 0414970.4 |
| Sep. 15, 2004 | (GB) | ................................ 0420595.1 |
| Sep. 24, 2004 | (GB) | ................................ 0421281.7 |
| Sep. 30, 2004 | (GB) | ................................ 0421720.4 |
| Dec. 3, 2004 | (GB) | ................................ 0426575.7 |
| May 23, 2005 | (GB) | ................................ 0510325.4 |

(51) Int. Cl.
*H02H 3/08* (2006.01)
(52) U.S. Cl. .................................................. 361/93.1
(58) Field of Classification Search ............ 361/62, 361/82, 93.1, 79, 113, 42; 324/424, 522, 324/536
See application file for complete search history.

(56) References Cited

U.S. PATENT DOCUMENTS 4,922,368 A * 5/1990 Johns ........................ 361/62

(Continued)

FOREIGN PATENT DOCUMENTS

| DE | 44 07 117 A1 | 9/1995 |
| GB | 2 253 956 A | 9/1992 |

OTHER PUBLICATIONS

Johannsmeyer, "Fieldbus for Process Automation in Hazardous Locations—Actual Developments," Explosion Safety in Hazardous Areas, Nov. 11-13, 1999, Conference Publication No. 469, IEE 1999, pp. 61-67.

International Search Report issued on Oct. 5, 2005 in connection with corresponding International Application No. PCT/GB2005/002638.

*Primary Examiner*—Jared J Fureman
*Assistant Examiner*—Angela Brooks
(74) *Attorney, Agent, or Firm*—Lerner, David, Littenberg, Krumholz & Mentlik, LLP

(57) ABSTRACT

An electrical circuit comprising a power supply, a load and an incendive arc prevention means comprising a monitoring means and an isolation means, in which the monitoring means monitors the electrical circuit by means of a reactor means, in which if a short circuit with the potential to cause an incendive arc occurs in the electrical circuit the reaction of the reactor means is detected by the monitoring means and the isolation means fully or partially isolates the power supply from said short circuit, such that an incendive arc cannot occur, in which if an event with a current and/or voltage pattern which is characteristic of a propagating non-incendive arc occurs in the electrical circuit between the power supply and the load, the reaction of the reactor means is detected by the monitoring means, and the isolation means fully or partially isolates the power supply from said event, such that an incendive arc cannot occur.

31 Claims, 16 Drawing Sheets

U.S. PATENT DOCUMENTS

| | | |
|---|---|---|
| 5,982,594 A | 11/1999 | Huczko |
| 6,052,265 A * | 4/2000 | Zaretsky et al. ............... 361/42 |
| 6,128,169 A * | 10/2000 | Neiger et al. ................. 361/42 |
| 6,477,022 B1 * | 11/2002 | Ennis et al. ................... 361/42 |
| 2002/0015273 A1 * | 2/2002 | Lytollis ..................... 361/93.9 |
| 2002/0024782 A1 * | 2/2002 | Kim et al. ..................... 361/42 |
| 2005/0073780 A1 * | 4/2005 | Elms et al. .................... 361/42 |

* cited by examiner

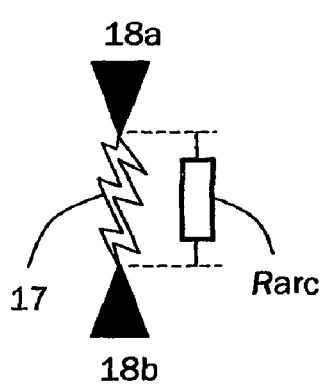 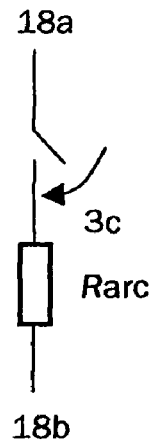 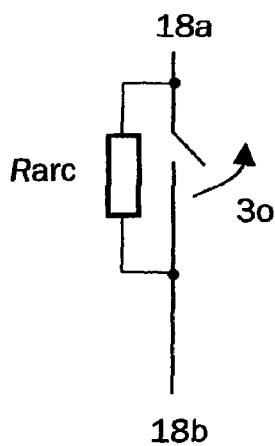
Fig. 5  Fig. 6  Fig. 7
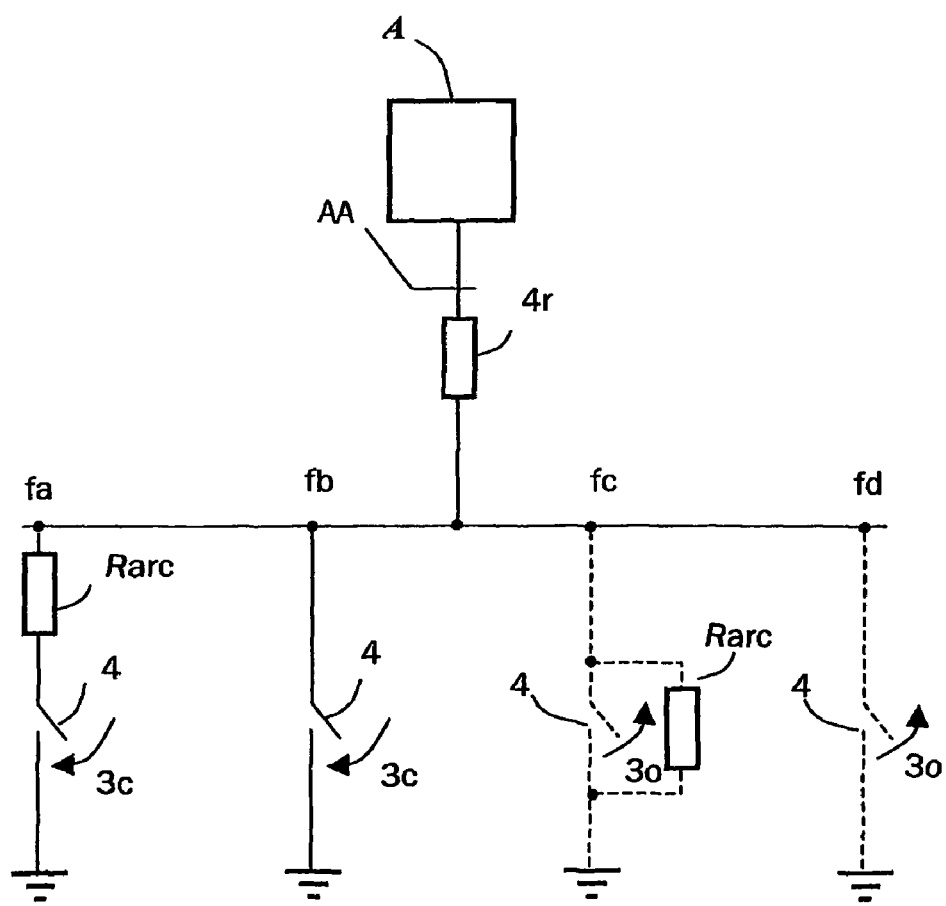
Fig. 8

ELECTRICAL CIRCUIT WITH INCENDIVE ARC PREVENTION MEANS

This invention relates to an electrical circuit with incendive arc prevention means, for use particularly, but not exclusively in combustible atmospheres, and in particular gas group classification IIC, Hydrogen and Acetylene, and below, for example gas group IIB and IIA, for gas and/or dust.

Traditional intrinsically safe power supplies for use in such atmospheres operate by continuously limiting the energy to a system, such that any potentially incendive occurrence is always adequately energy limited to a safe level. This limitation is continuously applied, even though a load and a cable may be operating in a non-incendive way, for example, during normal operation, at a safe temperature, and without any arcing.

FIG. 1 is a simple diagrammatic view of a known intrinsically safe power supply. A linear intrinsically safe power supply comprises a clamped voltage source V and a current limiting resistor R. A potentially incendive fault 4r, 4 is non-incendive because of the current and voltage restrictions to the power supply.

FIGS. 2 and 3 are simple diagrammatic views of alternative known intrinsically safe power supplies. FIG. 2 shows a non-linear power supply comprising a trapezoidal type current limiting circuit, and FIG. 3 shows a rectangular type current limiting circuit. In these examples the current is controlled in a much tighter manner so a higher working current and a lower short circuit current are created, which allows a much higher inductive load.

The major drawback of these types of systems is that they continuously limit the energy to the circuit even though the attached equipment may be functioning in a safe or non-incendive manner. As a result these circuits are limited to a low power.

An alternative approach is to use a reactive power supply, such as is disclosed by U.S. Pat. No. 5,982,594, however this system is somewhat limited in its application.

The power source only reacts to a particular type of formed arc that has repeatable and discernable characteristics which are different to a resistive fault or a load, and which are typical of gas groups lower than IIC. The arc characteristics found in a 'non-mining' gas group IIC would not be adequately detected.

Other known systems can detect a series make or break in an electrical path, but only where the path is non-inductive and protected by mechanical protection means to prevent the output from shunt type faults. Further, some other known systems use continuous interruption [CIS] to the supply output where the interruption mark-space ratio is sized and timed to prevent any propagating arc from ever becoming incendive. However, this technique limits the use of superimposed low frequency signalling, and at the proposed power levels has a frequency dictated limit to the cable length that can be used.

The present invention is intended to overcome some of the above problems and to provide a novel approach which reacts dynamically to both arcs with the potential to become incendive, and short circuits with the potential to form arcs.

Therefore, according to the present invention an electrical circuit comprises a power supply, a load and an incendive arc prevention means comprising a monitoring means and an isolation means, in which the monitoring means monitors the electrical circuit by means of a reactor means, in which if a short circuit with the potential to cause an incendive arc occurs in the electrical circuit the reaction of the reactor means is detected by the monitoring means and the isolation means fully or partially isolates the power supply from said short circuit, such that an incendive arc cannot occur, in which if an event with a current and/or voltage pattern which is characteristic of a propagating non-incendive arc occurs in the electrical circuit between the power supply and the load, the reaction of the reactor means is detected by the monitoring means, and the isolation means fully or partially isolates the power supply from said event, such that an incendive arc cannot occur.

Thus, the present invention deviates from the traditional method of limiting the energy of a circuit, and instead reacts to all faults, or potential faults. Thus, the electrical circuit of the present invention can be a higher power circuit than known intrinsically safe circuits. The incendive arc prevention means of the present invention also deviates from known reactive systems in that it is driven by the behaviour of the circuit itself and not by actual faults. This makes it intrinsically safer.

(The phrase "fully or partially isolates" is used above and further herein. The phrase is intended to be read in context, and means that the power supply (or the load) is isolated completely from the rest of the circuit, or is only isolated up to a point at which danger is avoided. The invention includes both of these arrangements.)

The present invention relies on the characteristic effects of non-incendive arcs, and the characteristic effects of short circuits or connecting circuits.

Put simply, incendive or non-incendive arcs that form in gas groups IIA, IIB and IIC propagate through the combustible gas between two conductors by heating a path through the gas between the two conductors. In other words the arc's path through the gas has a resistance which converts electrical energy into heat energy. In fact the propagation of an incendive arc is a little more complex than this, as it depends on the voltage potential across it as well as the energy dissipated into it.

However, the first and most important characteristic of such arcs is that for the first ten microseconds or so, they exhibit an approximate resistance of between twenty and fit Ohms, and typically twenty-five to thirty Ohms. This is a repeatable and defined characteristic that is inserted into a circuit when the arc is formed. After that time an arc begins to obtain an infinite impedance characteristic that frequently attains a resistance that provides maximum energy conversion at the highest current and voltage it can draw from a given power source.

FIG. 4 is a graph showing the properties of a propagating arc. As shown in FIG. 4, in the first ten microseconds or so the energy of the arc remains in a non-incendive zone 35, and after ten microseconds or so the arc moves into an incendive zone 34. The arc event of FIG. 19 is characteristic of a gas group IIC condition. Once the arc transitions into the incendive zone 34, it needs time to develop enough energy to become incendive, according to the formula:

$$E = \int_0^t VI \delta t$$

where E is the required energy to instigate an incendive reaction for a given Stoichiometric oxidizer/fuel burn, or for an oxidiser/fuel ratio that requires the least energy to ignite. (Some spark test alternatives require oxygen and hydrogen mixtures to be used, which is the most easily ignitable combination, and allow simple testing with a safety factor included and without the requirement for test circuit adjustments, such as voltage and/or current, to account for a safety factor.)

Therefore, there is a window of time of between about zero to ten microseconds or so to perform an evasive action before any arc becomes incendive.

FIG. 5 is a simple diagrammatic view of an arc. In FIG. 5 an arc 17 is generated across a spark gap 18a to 18b, and the arc 17 has an apparent resistance Rarc. For the first ten microseconds the arc resistance Rarc has a value of typically twenty-five to thirty Ohms. This characteristic is true of make-type arc and break-type arcs. FIGS. 6 and 7 are simple diagrammatic views of a make type arc and a break type arc. In FIG. 6 a make type arc closing 3c has an internal resistance Rarc, and in FIG. 7 a break type arc opening 30 also has an internal resistance Rarc.

Apart from creep type arcs, which are accounted for in intrinsically safe designs, these two types of fault are the only fault scenarios that can occur, and they are electronically or electrically detectable by the reaction of the reactor means of the present invention.

There are different types of fault which can lead to a make type arc or a break type arc. FIGS. 8 and 9 are simple diagrammatic views of circuits with a number of possible fault scenarios, all of which can be detected and dealt with by the present invention.

FIG. 8 shows four shunt type faults including a make-type arc fa, where an actual arc forms, a physical contact fb, where a short circuit with the potential for an incendive arc forms, a subsequent break type arc fc, where an actual arc forms, and a subsequent physical break fd, with the potential for an incendive arc to form. An occurrence which could lead to these faults could be a resistively oxidised piece of metal falling across power rails. Obviously, for a 'break' like fc or fd to occur, a 'make' must first occur. Of course, if any resistive or conductive fault like those shown in FIG. 8 has a high enough resistance or conductance to prevent any arc being incendive, then the circuit will be intrinsically safe, and the arc can be ignored.

However, the present invention is intended to be used with higher power circuits which do not have enough resistance or conductance to prevent an arc becoming incendive, and thus all faults, or any event which appears to be a fault, must be dealt with.

Shunt type faults of this kind are readily detectable from the reaction of the reactor means of the present invention because the voltage in the circuit drops.

FIG. 9 shows four series type faults including a make-type arc fa, where an actual arc forms, a physical contact fb, where the potential for an incendive arc forms, a subsequent break type arc fc, where an actual arc forms, and a subsequent physical break fd, with the potential for an incendive arc to form. Any of these "faults" could be normal operating occurrences like a connection or a switch action. Series type faults of this kind are also readily detectable from the reaction of the reactor means of the present invention, either by a voltage rise or a voltage drop across the reactor means.

These faults are all detectable, however it will be appreciated that the invention will only function if the arc prevention means can isolate the power supply before any arc becomes incendive. This is clearly possible within the confines of a small electric circuit, however the invention is intended to be used with very long cables typical of large instillations.

Any length of cable has a propagation time delay proportional to its length, inductance, resistance and capacitance. Typically, one kilometer of twisted pair cable will delay an event by approximately six microseconds. Therefore, if a propagating non-incendive arc occurs at one end of a one-kilometer cable, the event will not be detected at the other end until six microseconds later. After detection, the non-incendive arc must be quenched to prevent it becoming incendive, and to do so the power supply is fully or partially isolated. However there is still energy in the cable after the power supply is isolated, and this energy continues to fuel the arc because it must be exhausted. Therefore, there is a further propagation time from the point the power supply is isolated to the full exhausting of the energy in the cable. This propagation time is again proportional to the cable parameters and will be a further six microseconds, making the total time, from the beginning of the arc event to quenching of that arc, approximately twelve microseconds. In addition, the detection and reaction time of the arc prevention means is not instantaneous, and may typically by as high as one or two microseconds in duration. In addition, the arc prevention means may have an elevated detection threshold as a result of employing a deadband to avoid reacting to noise on the line (further details of which are described below), which can also add to the delay in reacting. Further to that, in practice there may be additional capacitance loading or damping on the cable, which will also add to the delay times.

Therefore, if the arc prevention means is located by the power supply, there will be a restriction on the length and properties of cable which can be used.

Therefore, in a preferred embodiment of the invention said monitoring means and said isolation means can be disposed at the power supply end of the electrical circuit, and the incendive arc prevention means can further comprise a load end monitoring means and a load end isolation means.

In one embodiment the load end isolation means can fully or partially isolate the load from the electrical circuit if the voltage drops below a pre-determined threshold. With this arrangement the load is isolated if a short circuit with the potential to cause an incendive arc occurs in the electrical circuit and the power supply end isolation means fully or partially isolates the power supply, because under such circumstances the voltage will drop. This arrangement will also isolate the load if the voltage drops in the circuit for other reasons. This embodiment can be realised with a voltage collapsing arrangement comprising a comparator referenced to a reference voltage. The output of the comparator can be used to fully or partially isolate the load from the electrical circuit.

This arrangement adds further safety into the system because the load will be fully or partially isolated in the event of a short circuit it also allows for other features described below to function. This arrangement is a relatively simple way of isolating the load, and it has a number of practical applications as described below.

However, in other embodiments a more complex and dynamic arrangement can be used, in which if an event with a current and/or voltage pattern which is characteristic of a propagating non-incendive arc occurs in the electrical circuit between the power supply and the load, the load end monitoring means can detect it and the load end isolation means can fully or partially isolate the load from said event.

This arrangement effectively doubles the length of cable which can be used. However, in one version of the invention the power supply end monitoring means and isolation means can be spaced apart from the load end monitoring means and isolation means by such a distance that either one of them can detect and quench a non-incendive arc which occurs at any point in the circuit between them. This version is doubly safe as the electrical circuit has a built in redundancy system.

However, in a preferred embodiment the power supply end monitoring means and Isolation means and the load end monitoring means and isolation means can be spaced apart by such a distance that each one can detect and quench a non-incendive arc which occurs at any point between their location and a mid point between their locations. This version allows a cable of approximately twice the length.

It will be appreciated that if a functional electrical circuit as described above experiences a fault, remedial action may be required. However, to avoid the necessity of having to manually turn the electrical circuit back on, a fault probe circuit can be provided which can probe for faults, and reconnect the power supply when the fault ends.

Therefore, in a preferred embodiment the electrical circuit can be provided with a non-incendive fault probe circuit. If the power supply and the load are fully or partially isolated in use, the non-incendive fault probe circuit can pass non incendive level current and/or voltage into the electrical circuit. The non-incendive fault probe circuit can be further adapted to remove the full or partial isolation of the power supply when resistance in the electrical circuit rises above that at which a short circuit would be present.

The fault probe circuit allows a cable to be assessed for potentially incendive faults without allowing the fault, should one exist, to attain enough energy to become potentially incendive. For example, if a resistive fault occurs across a cable's poles, and it is at least lower than a resistance that could lead to an incendive arc, then the fault probe circuit will not allow any incendive energy to the cable, regardless of the fault's potential.

It will be appreciated that if a break occurs in the electrical circuit, the fault probe circuit will remove the full or partial isolation of the power supply because no short circuit or resistance indicative of a fault is present. However, no make-type arc can become incendive in these circumstances because the incendive arc prevention means will isolate the power supply again.

In one embodiment if a short circuit with the potential to cause an incendive arc, or an event with a current and/or voltage pattern which is characteristic of a propagating non-incendive arc occurs in the electrical circuit, the power supply end isolation means can fully isolate the power supply. In this embodiment the non-incendive fault probe circuit can be powered by a second power supply different from the electrical circuit power supply.

However, in a preferred arrangement if a short circuit with the potential to cause an incendive arc, or an event with a current and/or voltage pattern which is characteristic of a propagating non-incendive arc occurs in the electrical circuit, the power supply end isolation means can partially isolate the power supply to a non-incendive level. Thus, the non-incendive fault probe circuit can be powered by said partially isolated power supply.

It will be appreciated that a fault on a cable may comprise similar characteristics to a load, and therefore if the load were still connected to the cable the fault probe circuit may identify it as a fault. This is why the load end isolation means fully or partially isolates the load from the electrical circuit if the voltage drops below a pre-determined threshold. This action allows the cable to be assessed independently of the load.

The electrical circuit can be provided with recovery control means. After a fault has ended the recovery control means can energize the electrical circuit gradually over a time period sufficient to prevent the power end monitoring means and/or the load end monitoring means interpreting the energising of the electrical circuit as an event with a current and/or voltage pattern which is characteristic of a propagating non-incendive arc.

Preferably the recovery control means can comprise a function generator which can directly or indirectly variably adjust the output voltage and/or current of the power supply. The same thing can be provided at the load end.

In practice, the electrical circuit of the invention may be used with a two-wire communication system, and there may be interruptions, signalling or noise on the circuit. This noise must not repeatedly trigger the system to isolate the power supply or the load.

Therefore the power supply end monitoring means and isolation means can be adapted to not fully or partially isolate the power supply from the electrical circuit when noise or signalling is detected within a deadband about a mean current or voltage level.

Likewise the load end monitoring means and isolation means can also be adapted to not fully or partially isolate the load from the electrical circuit when noise or signalling is detected within a deadband about a mean current or voltage level.

The reactor means described above can be any device which will react in a detectable way when any of the faults described above occur.

There are several known electronic circuits which could be used to detect the faults described above. Therefore, in one embodiment the reactor means can be an active electronic gyrator adapted to emulate inductor behaviour. In another embodiment the reactor means can be a resistor.

However, in a preferred embodiment the reactor means is an inductor and reaction of the inductor to a short circuit, which is detected by the monitoring means, is a voltage change generated across the inductor. In one version of the invention a shunt resistor can be connected across the inductor.

An advantage of using an inductor is that the impedance of an inductor will curtail or suppress a make-type arc from occurring on a live circuit. Therefore, if a break occurs in the electrical circuit and the fault probe circuit subsequently removes the full or partial isolation of the power supply because no short circuit or resistance indicative of a fault is present, no make-type arc can form because of the inductor impedance.

The inductor can be monitored with a "window" type comparison measurement. Therefore, the power supply end monitoring means and isolation means can comprise a positively referenced comparator means and a negatively referenced comparator means. The output of said comparators can be used to fully or partially isolate the power supply from the electrical circuit. The positively referenced comparator and the negatively referenced comparator can be referenced to the source voltage. (The invention also includes embodiments in which only a positively or only a negatively referenced comparator means is used.)

The load end monitoring means can also use a reactor means in the form of an active electronic gyrator adapted to emulate indictor behaviour, or a resistor.

However, in a preferred embodiment an inductor is used, with or without a shunt resistor connected across it. As above, the inductor can be monitored with a "window" type comparison measurement. Thus, the load end monitoring means and isolating means can comprise a positively referenced comparator means and a negatively referenced comparator means. The output of said comparators can be used to fully or partially isolate the load from the electrical circuit. The positively referenced comparator and the negatively referenced comparator can be referenced to the incoming voltage.

The invention can be performed in various ways, and multiple embodiments will now be described by way of example and with reference to the accompanying drawings, in which:

FIG. 5 is a diagrammatic view of an arc;

FIG. 6 is a diagrammatic view of a make-type arc;

FIG. 7 is a diagrammatic view of a break-type arc;

FIG. 8 is a diagrammatic view of a number of shunt-type fault scenarios;

Figure 10:
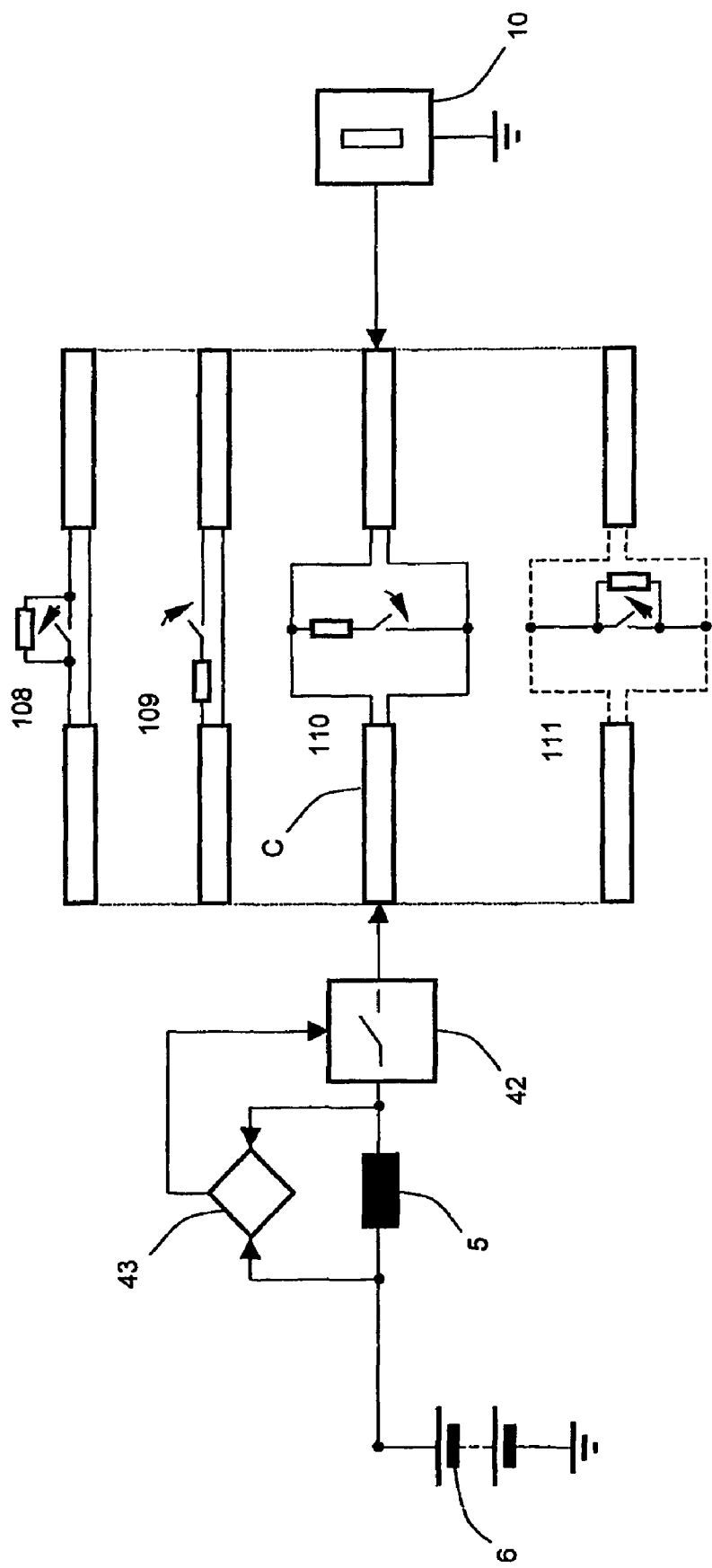
FIG. 10 is a diagrammatic view of an electrical circuit according to the present invention.

As shown in FIG. 10, an electrical circuit comprises a power supply 6, a load 10 and an incendive arc prevention means comprising monitoring means in the form of comparator 43, and isolation means, in the form of switch 42. The monitoring means 43 monitors the electrical circuit by means of a reactor means, in the form of inductor 5. If a short circuit 111 with the potential to cause an incendive arc occurs in the electrical circuit, in this case along cable C, the reaction of the reactor means 5 is detected by the monitoring means 43 and the isolation means 42 fully or partially isolates the power supply 6 from said short circuit 111, such that an incendive arc cannot occur. In this case the power supply 6 is fully isolated by switch 42. If an event with a current and/or voltage pattern which is characteristic of a propagating non-incendive arc, which could be series break 108, series make 109 or shunt make 110, or anything like them, occurs in the electrical circuit between the power supply 6 and the load 10, (i.e. on the cable C), the reaction of the reactor means 5 is detected by the monitoring means 43, and the isolation means 42 fully or partially isolates the power supply 6 from said event, 108, 109, 110, such that an incendive arc cannot occur. In this case the power supply 6 is fully isolated by switch 42.

Figure 11:
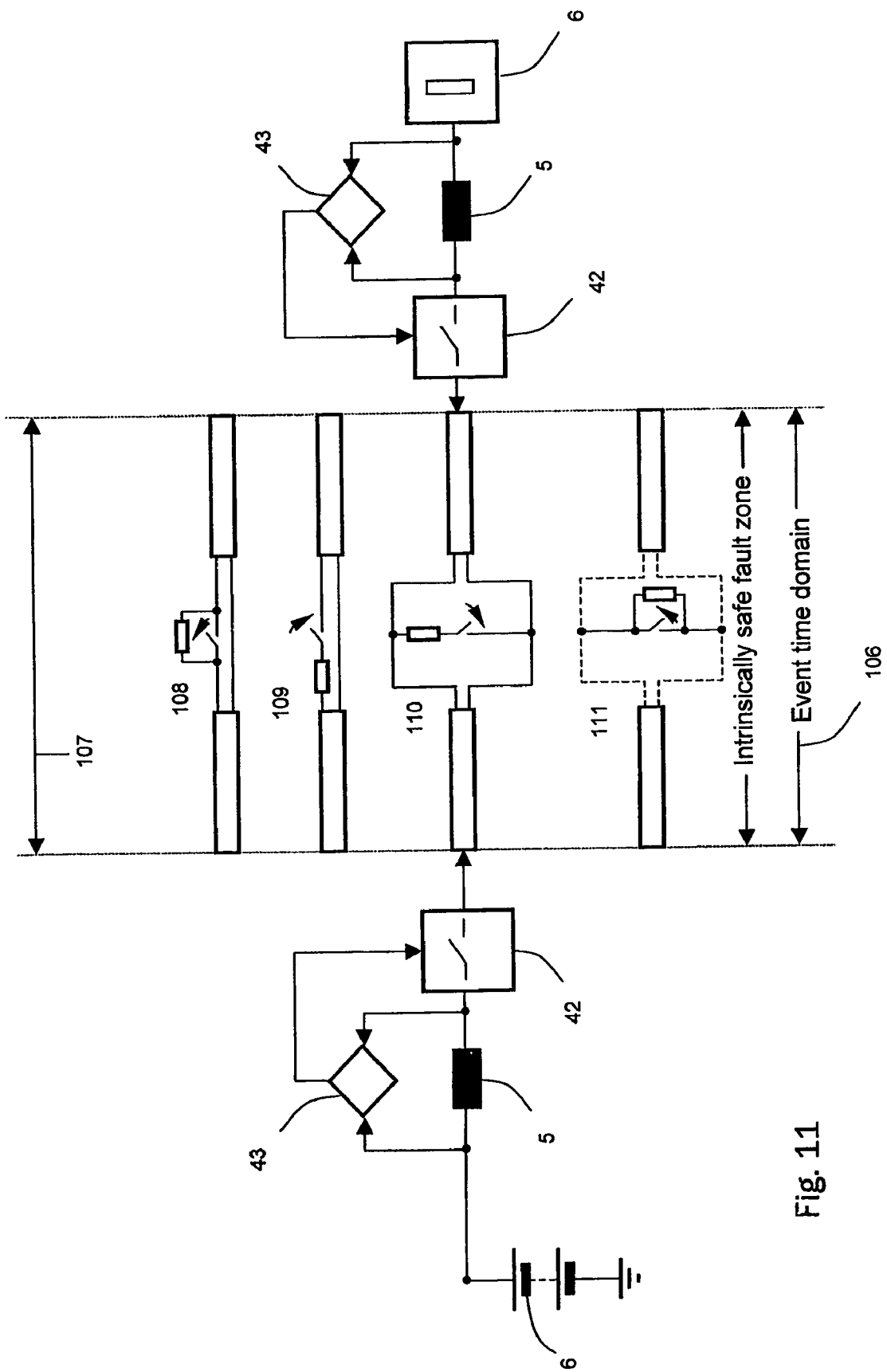
FIG. 11 is a diagrammatic view of another electrical circuit according to the present invention.

FIG. 11 shows another electrical circuit according to the present invention, which is similar to the circuit shown in FIG. 10, except that the incendive arc prevention means further comprises a load end monitoring means and isolating means similar in construction to that at the power supply end. Therefore, if an event with a current and/or voltage pattern which is characteristic of a propagating non-incendive arc occurs in the electrical circuit between the power supply 6 and the load 10, the load end monitoring means detects it and the load end isolation means fully or partially isolates the load from said event.

FIGS. 10 and 11 show the invention in its most simplistic form. The following description shows how the invention can be practically put into effect. (FIG. 12 onwards show various alternative arrangements or characteristics of the power supply end and the load end of electrical circuits according to the present invention, and it will be appreciated that some of the features of these sections of circuits will be interchangeable with others, and that these different power supply end and load end arrangements can be used in any combination with each other as appropriate. Where components are the same as in previous Figures, the same reference numerals have been used.)

Figure 12:
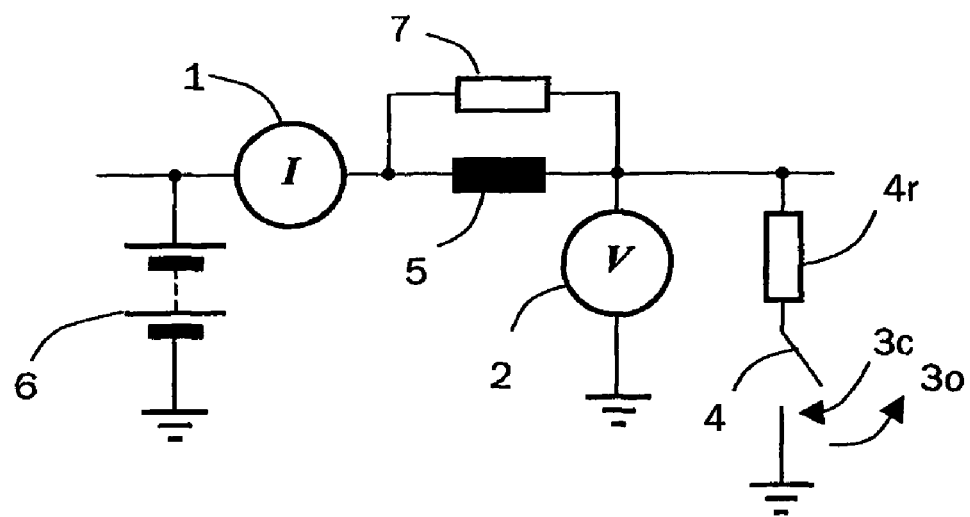
FIG. 12 is a diagrammatic view of the power supply end of another electrical circuit according to the present invention.

FIG. 12 shows the power supply end of an electrical circuit according to the present invention. An inductor 5 is positioned in the circuit between the power supply 6 and faults 3c, 3o. When resistance in the circuit increases or decreases as a result of an incendive arc, a potentially incendive arc, a closing contact fault 3c or an opening contact 3o, the current step change in the circuit generates a voltage change 2 across the inductor which can be detected.

(It will be appreciated that the attachment or disconnection of a load may have the same effect as one or other of the above faults, and it would therefore be treated in the same way. In some cases, the attachment or disconnection of a load creates a non-incendive current step change which it would be safe to ignore. Further details of a means to discriminate such events are described below.)

A shunt resistor 7 is provided to minimise the voltage swing across the inductor 5. Such a shunt resistor can also help to attain a lower impedance if a high capacity inductor is used in order to attain a longer more easily detectable reaction time.

The inductor 5 and resistor 7 amplify the effect of current and/or voltage change in the circuit, compared to a conventional current sense resistor.

When there is any interruption to current flow, which is dictated by the series resistance 4r and/or an arc resistance (not shown), the voltage 2 across the inductor 5 and/or the current through the resistor 7 and inductor 5, changes proportional to the values of the components of the circuit.

Figure 13:
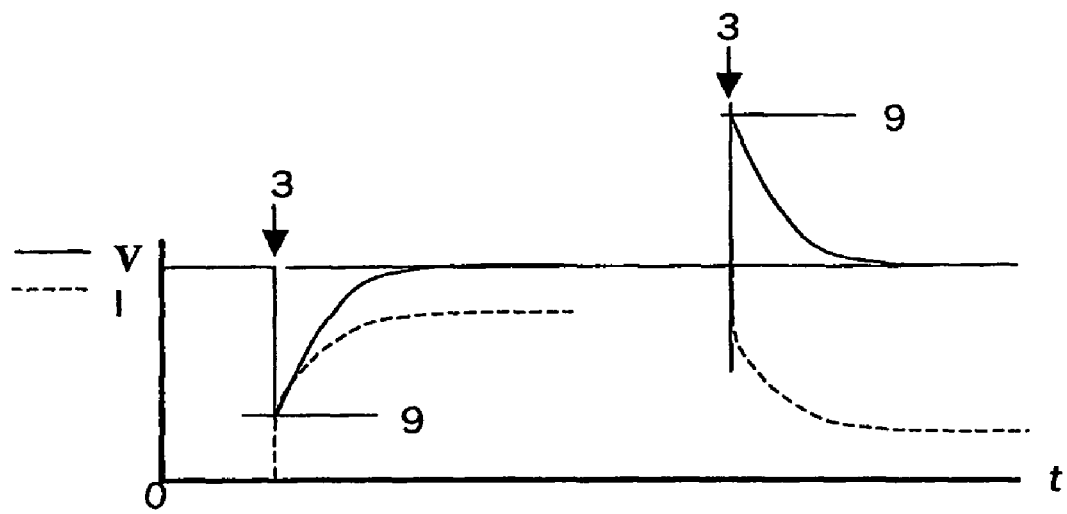
FIG. 13 is a graph showing the current and voltage change following closing contact 3c, and opening contact 3o, as shown in FIG. 10

FIG. 13 shows the change in the current and voltage of the circuit following events 3c and 30. FIG. 13 also shows the voltage limits 9c and 9o which are dictated by the shunt resistor 7. An ideal inductive circuit with a closing contact 3c would tend towards zero volts, and a circuit with an opening circuit 30 would tend towards infinity volts. However in the practical circuit of FIG. 12, the inductor 5 has an inductance of two milli Henries, and the resistor 7 has a resistance of six Ohms. In the example shown the fault resistance 4r is also six Ohms. Therefore, the closing voltage 9c is approximately half the source voltage and the opening voltage 9o is approximately one and a half the source voltage. The power source 6 is twenty-four volts, so the closing voltage 9c is about twelve volts, and the opening voltage is about thirty six volts. The current could change by as much as two amps based on the above criterion.

Figure 9:
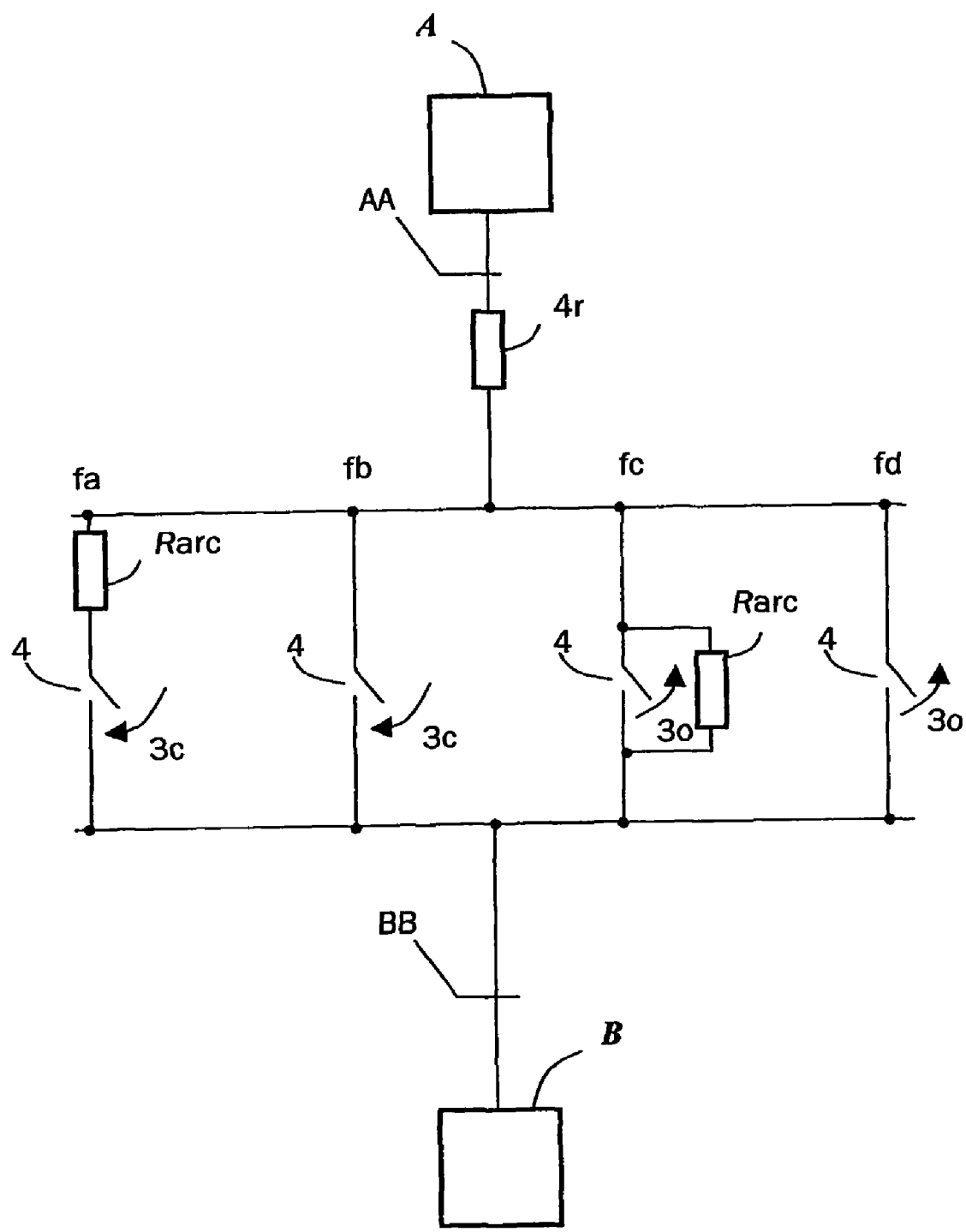
FIG. 9 is a diagrammatic view of a number of series-type fault scenarios.

Should the contact 4 comprise an arc, like those described at fa and fc of FIGS. 8 and 9, and that arc is of an initial twenty five ohms, then the step change in current and/or voltage will follow the same arguments as above, although they will be less pronounced.

FIG. 13 shows how the step changes are readily detectable. It will be appreciated that the invention will work with less pronounced step changes, provided they are still measurable.

A further attribute of the inductor 5 is that the DC resistance to current is very low, and therefore the efficiency is high when considering power sources. If a resistor like resistor 7 were used alone, it might cause unacceptable voltage or power losses for many power supplies. Of course, for lower current systems using higher voltages the loss across a resistor may be acceptable. So a lone resistor could be used, provided the detection technique is still adequate to at least detect a potentially incendive scenario.

Another feature of the electrical circuit shown in FIG. 12 is that the inductor 5 is of a sufficient size to provide adequate impedance to curtail or suppress any make type fault or arc, 3c. The impedance of the inductor 5 is high enough to prevent any spark-gap from instigating or propagating an arc cornet, because the initial event current through an ideal inductor is zero, or insignificant for a suitably designed modern day inductor with negligible parasitic bypass.

However, the path of the shunt resistor 7 may suppresses this effect to a point where the bypass current could cause an incendive arc. Therefore, adequate steps are required to minimise the bypass current an/or to detect the current passing through the resistor 7, and to take action if required. During steady state current, any increase in current demand can be tolerated, as a small step change from steady state conditions tends not to be incendive or to attain incendive potential.

Of course, as with any passive inductor carrying current, the energy stored in the inductor is released if there is a step decrease in current of a break-type fault following a make-type fault or a load. When the energy is released it generates a voltage across the inductor, and if the inductor is unprotected this would lead to a subsequent arc, with a high probability of becoming incendive.

As stated above there are active electronic circuits which emulate inductor behaviour, without the problems of stored energy usually encountered with passive ferrite inductors. Such circuits could be used instead of inductor 5.

Thus, if the circuit in FIG. 12 experiences a positive or a negative step change or interruption in current demanded from the power source which is characteristic of a situation with the potential for an incendive arc, or characteristic of an arc, it is detected. This is irrespective of whether or not the fault is an arc or another unrelated fault with similar characteristics. There is no discrimination between arc formation and a similar characteristic non-arcing interruption. In addition additional protection is afforded by using a positive current step change impedance, which provides energy suppression to 'make' type faults. Two poles coming together will not lead to the formation of an arc up to, and including, the point of contact.

Figure 14:
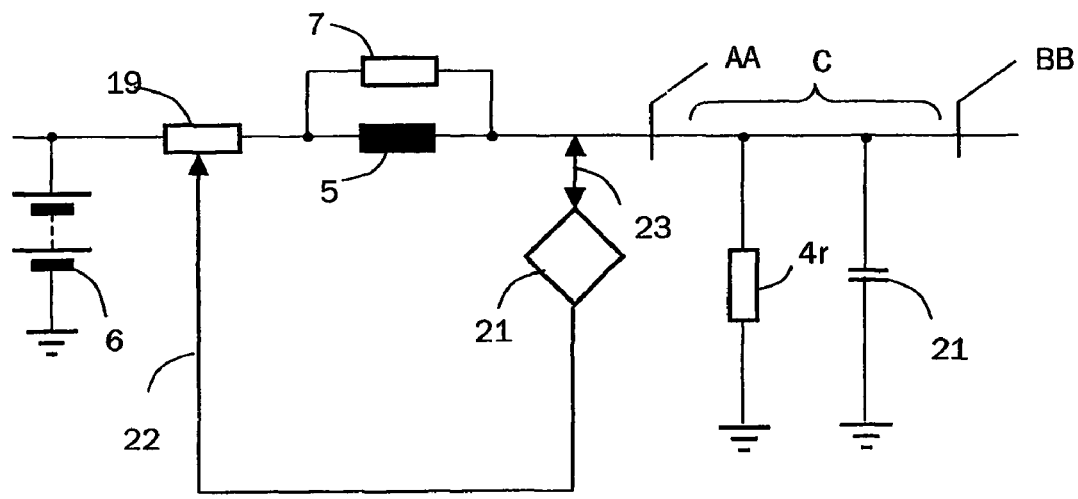
FIG. 14 is a diagrammatic view of the power supply end of another electrical circuit according to the present invention.

FIG. 14 shows another power supply end of an electrical circuit according to the present invention. The circuit operates in the same way as the circuit shown in FIG. 12, except that FIG. 14 shows the means by which the circuit reacts to faults. A voltage detection 23 is arranged across a dynamic current detection circuit comprising inductor 5 and shunt resistor 7, and a control means 21 controls a series element 19. If the voltage falls or rises at the detection point 23, in a manner characteristic of an incendive fault 4r potential or arc formation as described above, then the series element generates an isolating action to adequately quench the arc or to transition the fault 4r to a non-incendive potential by way of current and/or voltage reduction.

Therefore, FIG. 14 shows a very simple reactive circuit which can be configured to react fast enough to quench an arc within its non-incendive time zone, taking into account the cable length.

Following isolation the power supply needs to return to normal operation after the fault is clear, or is clear of any incendive potential. This is achieved with a fault probe circuit.

However, it will be appreciated that a fault on a cable may comprise similar characteristics to a load. Generally a cable comprises only a parallel or shunt capacitive attribute that differs from a normal load, which can typically be resistive or apparently resistive. If a resistive fault is applied then the difference between the load and the fault is indiscernible. Therefore if the load remains connected to the circuit, any fault probe circuit might not be able to discern any difference between a fault and the load. In such circumstances the circuit cannot be re-energised. Therefore the only option is to assess the load and the cable independently of each other.

Figure 15:
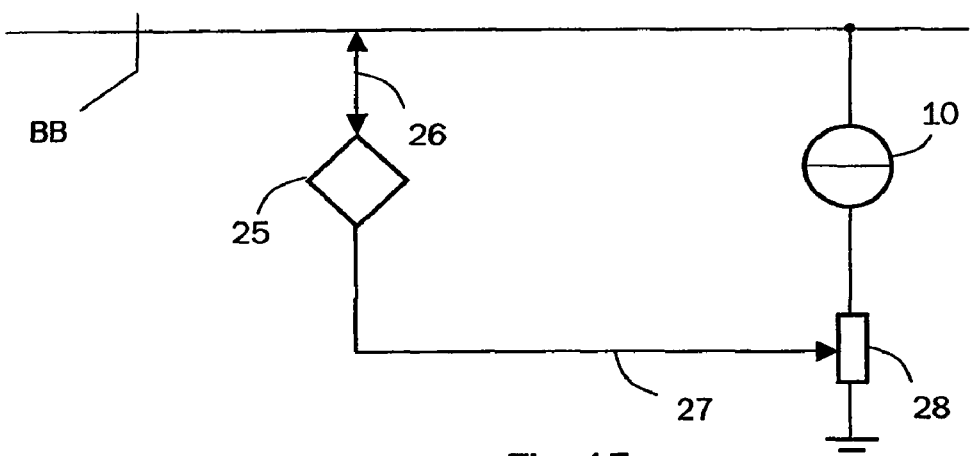
FIG. 15 is a diagrammatic view of the load end of another electrical circuit according to the present invention.

FIG. 15 shows how a load 10 can be isolated using simple means. A voltage detection 26 is connected to a control means 25, which is itself connected to a series element 28. The series element 28 isolates the load 10 from the circuit if the voltage at the input BB falls below a given value, for example ten volts.

If the load end shown in FIG. 15 is connected to the power supply end shown in FIG. 14, and the control means 21 shown therein isolates the power source 6 such that the voltage drops below 10 volts, then the voltage detection 26 will register that and the control means 25 can isolate the load 10. Thus, not only will the load 10 be isolated from any potentially incendive fault, but it is also isolated for the purposes of fault probing.

Figure 16:
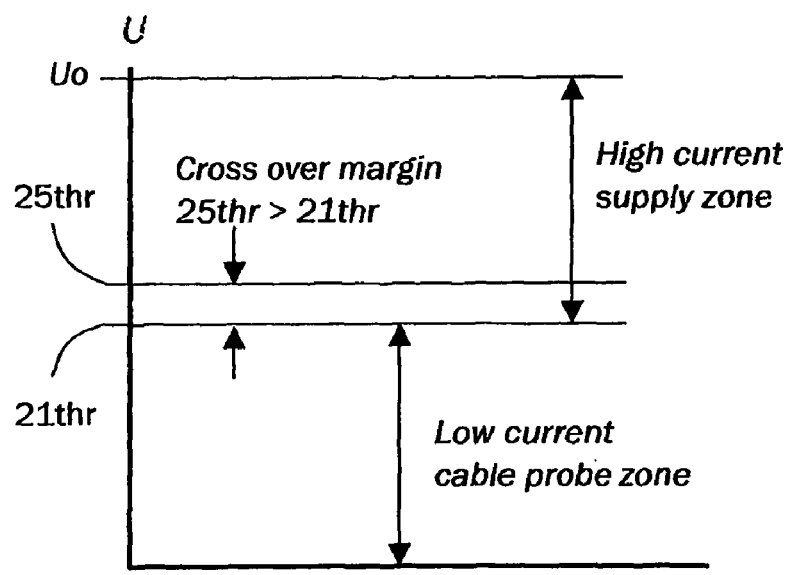
FIG. 16 is a graph showing the relationship between a low-current cable probe zone and a high current supply zone.

FIG. 16 shows how a circuit comprising the power supply end shown in FIG. 14 and the load end in FIG. 15 can be configured to accommodate practical tolerances. The voltage threshold for the power supply to be isolated $21thr$ is set below the voltage threshold of the load to be isolated $25thr$, so there is a cross over margin. Below the power supply threshold $21thr$ the energy supplied to the cable and to the load is restricted to non-incendive levels, and above the threshold the energy is allowed to increase to accommodate the load demand, which will only occur above the threshold. The zone below the threshold $21thr$ is classified as the cable probe or start up zone where only the cable is attached to the system, and in which the cable can be probed for any fault.

In practical circuits, and for two wire communication systems, there will be operational interruptions that must be tolerated or ignored. The power supply must continue as normal without any adverse interruption. In particular, things like fieldbus signals must not repeatedly trigger the arc prevention means to fully or partially isolate the power supply and/or the load.

Figure 17:
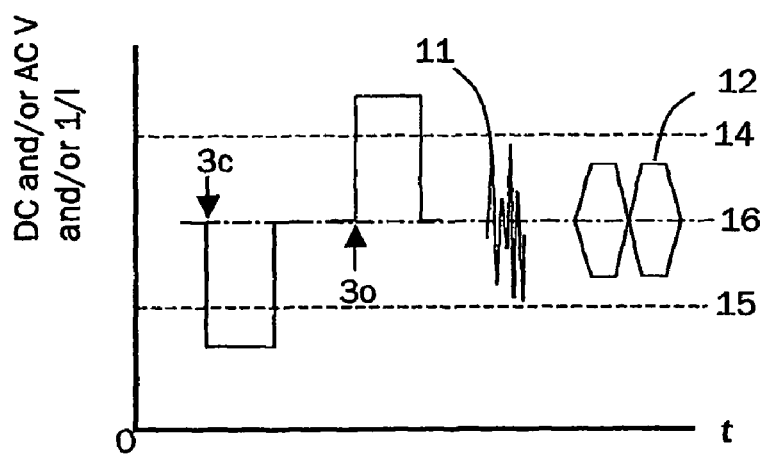
FIG. 17 is a graph showing a deadzone incorporated into an electrical circuit according to the present invention.

FIG. 17 shows how a deadband is employed about a mean 16 to differentiate between potentially incendive faults and normal operating noise. Potentially incendive interruptions 3c and 3o extend beyond the deadband and will trigger the arc prevention means to fully or partially isolate the power supply, whereas noise 11 and fieldbus signalling 12 will not. The mean may be fixed or it may be variable. If it varies the thresholds of the deadband 14 and 15 must track the threshold. High level spikes with short time duration may also be filtered to a degree if required, provided that the interruptions are not potentially incendive.

Figure 18:
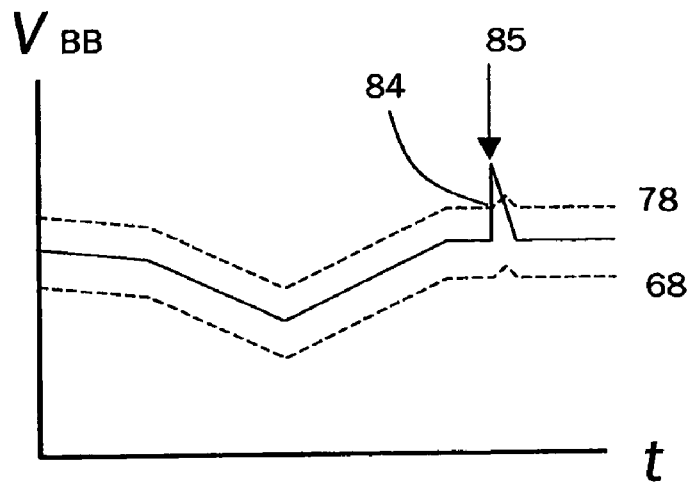
FIG. 18 is a graph showing the voltage tracking properties of an electrical circuit according to the present invention; and, FIG. 19 is a diagrammatic view of the power supply end of another electrical circuit according to the present invention.

FIG. 18 shows how the deadband tracks a varying mean, in this case at the load end BB. The positive 78 and negative 68 thresholds track the voltage V BB in an adaptable way until the voltage V BB changes faster than the tracking can compensate for, for example when an arc forms. The actual voltage transient 85 breaches the threshold 84 and is therefore detected. This type of tracking allows slow voltage variation and cable loss to be compensated for, and for an arc characteristic to be detected. Other techniques such as high pass window comparator filtering may be used as alternative to the above.

It will be appreciated that, in practice, the deadband increases the reaction time of any arc prevention means. Therefore if such a deadband is employed it must be factored into the whole circuit, and in particular the length of cable which can be used.

Figure 19:
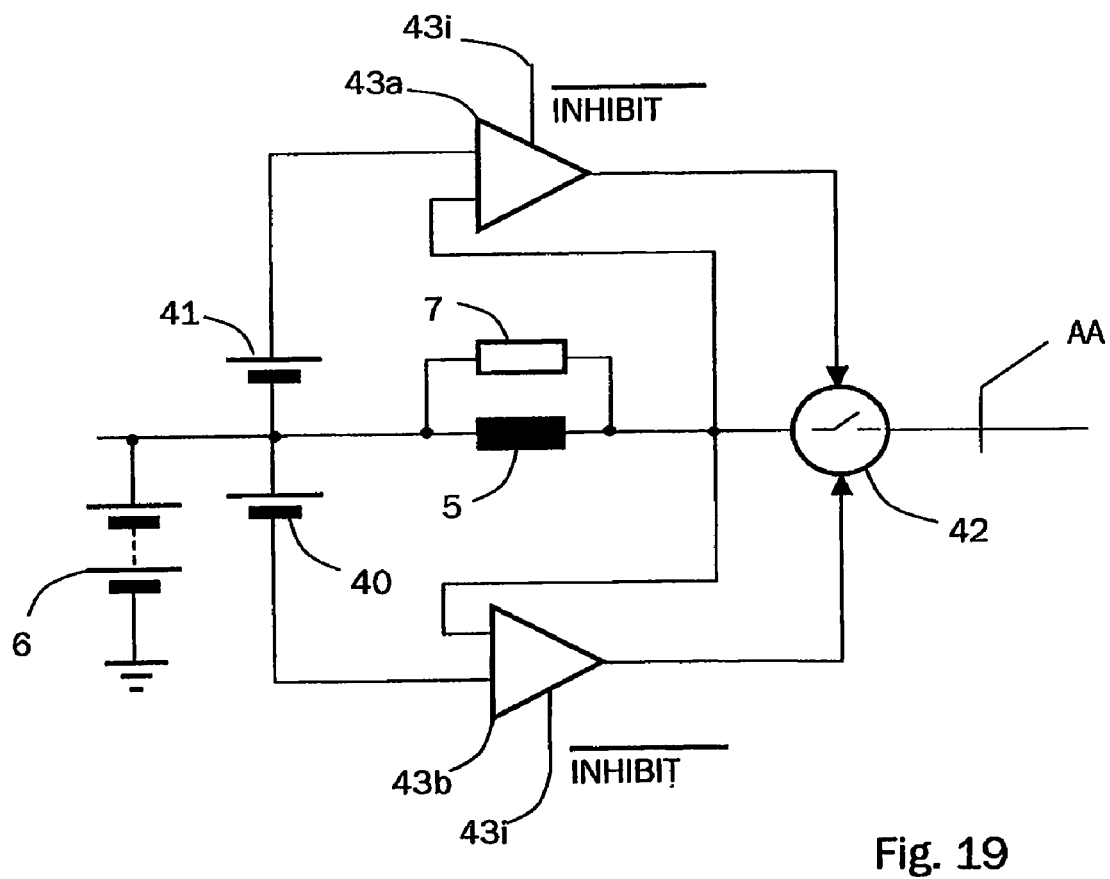

FIG. 19 shows the power supply end of an electrical circuit, as described above but in more detail. In FIG. 19 an intrinsically safe clamped voltage source 6 supplies circuit M. The voltage clamping can be at the source, or at any point up to the power supply output M. As described above, a potentially incendive make or break type fault in the circuit will cause the voltage and/or current of the power supply output AA to change. A make-type fault will cause the voltage to fall, and/or the current to rise, and a break-type fault will cause the voltage to rise and/or the current to fall.

The reactor means according to the invention comprises inductor 5 and shunt resistor 7, and the property being monitored is the voltage across the inductor 5, which is effected by current change.

The monitoring means according to the invention comprises a window comparator arrangement, capable of detecting both voltage rises and voltage drops in order to detect any type of fault. The rise in voltage is detected by a positively referenced 41 comparator 43a, and the fall in voltage is detected by a negatively referenced 40 comparator 43b. (Similar linear or non linear systems could be used instead of comparators.) The reference values are chosen to Ignore noise or signalling, as described above. The output of the comparators is used to isolate the output M at switch 42, thus effectively choking or removing the power to the output circuit if the fault were an arc it would be starved of energy and effectively quenched to prevent it becoming incendive. Provided the isolation remains in place the output remains intrinsically safe. The cable can now be probed for a fault, as described below.

In addition comparator inhibits 43i are provided which override or complement the safe isolation 42, regardless of comparator input measurement states. The inhibits are shown as falling to a low state. This arrangement allows for additional feedback or control regarding the provision of isolation for start-up or cable probe, as described below. The inhibits 43i may also be used for voltage clamping in a similar way to traditional 'crowbars'.

In the circuit in FIG. 19 the references are referenced to the source voltage, but they could alternatively be reference to ground or an absolute point. The advantage of referring to the source voltage is that if the source voltage deviates, fluctuates or ramps during normal loading, quench recovery or start up, it is detected or it will not affect the operational thresholds.

The sensing inputs may be further filtered or conditioned if required, so the detection window span can be decreased.

Figure 20:
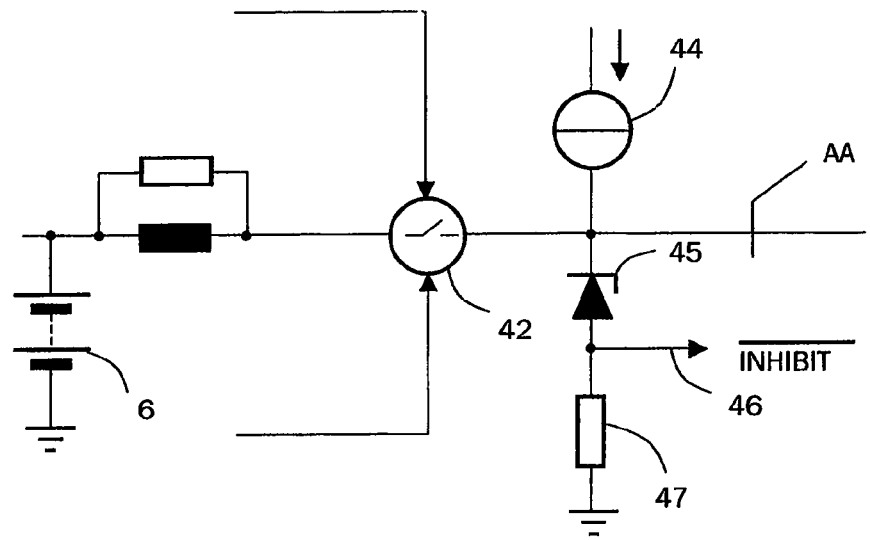
FIG. 20 is a diagrammatic view of the power supply end of another electrical circuit according to the present invention.

Once the power supply 6 has been isolated the cable can be probed for faults, provided the load has been isolated as described above. FIG. 20 shows the power supply end of an electrical circuit according to the present invention, in which a non-incendive fault probe circuit is provided, comprising current 44, Zener diode 45, output 46 and series resistor 47.

When the power supply 6 is isolated by switch 42, in the same manner as described above in relation to the circuit shown in FIG. 19, the output at AA falls to the non-incendive level of current 44. If there is an adequately low resistive fault remaining on the cable, which is governed by the probe current 44, the voltage across the Zener diode 45 will fall to a point where it stops conducting, which causes the voltage across the series resistor 47 to fall to a low state, which causes the output 46 to create a low inhibit signal, which is used to hold the switch 42 open. If the fault clears this sequence stops and the switch 42 is closed, so the output M can return to normal current and/or voltage.

However, when the power supply is reconnected to the circuit it cannot be done in a rectangular fashion, because the reconnection of the load might cause a drop in voltage which would cause the monitoring means and isolation means described above to fully or partially isolate the power supply again. Therefore, recovery control means are provided to prevent this occurrence, by reconnecting the power supply 6 in a stewed manner.

Figure 21:
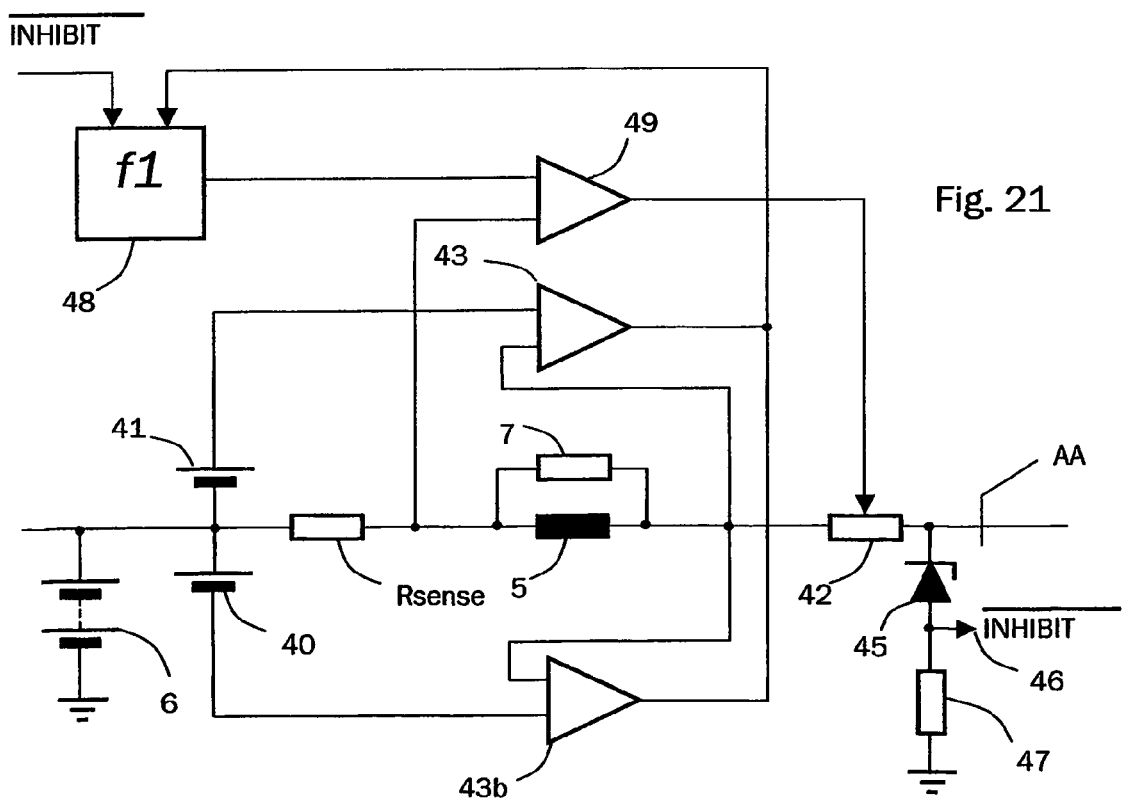
FIG. 21 is a diagrammatic view of the power supply end of another electrical circuit according to the present invention.

FIG. 21 shows the power supply end of another electrical circuit according to the present invention. The circuit in FIG. 21 uses an inductor 5 and shunt resistor 7 as the reactor means of the invention, and a window comparator comprising a 'low' trigger comparator 43b and a 'high' trigger comparator 43a, which monitor the voltage across the inductor 5, as the monitoring means of the invention. The isolation means of the invention comprises series element 42, however it can be controlled in a dynamic way in use.

The output of the window comparator arrangement, when a fault is detected, is used to trigger a function 48 to indirectly adjust the output voltage and/or current as required.

The circuit in FIG. 21 has a static current limit in the form of a conventional rectangular current limiter comprising a current sense resistor Rsense, which feeds an amplifier 49, which controls the series element 42 with a current reference obtained from the function generator 48. Therefore, for DC and slow progressive current changes, that are not indicative of a potentially incendive arc, the current characteristics of the power supply are understood and the upper limit of current, along with the clamped voltage source 6, defines the operational maximum voltage Uo and current Io parameters of the circuit.

Therefore, the output voltage and/or current can be indirectly adjusted in use by adjusting the current reference. If the reference falls, then the current limit will also fall.

Thus, if the output of the window comparator arrangement falls or rises in a manner which is indicative of a make-type arc or a break-type arc, and if the references 40 and 41 are adapted to detect this rise or fall and to ignore parasitic disturbance, then the arc or similar type fault will be detected, and the function 48 will trigger a shutdown.

(The series element 42 can be replaced with, or be complemented by, a shunt element. Such an arrangement could be used to reduce the power to the circuit by way of short circuiting the supply voltage)

The circuit in FIG. 21 also has a non-incendive fault probe circuit similar to that shown in FIG. 20, but which is driven by the power supply 6, and not by its own power supply, as in FIG. 20. The inhibit 46 holds the function 48 at a non-incendive level, so the power supply 6 provides a non-incendive probe current and/or voltage, which is held until the resistive fault on the cable increases to a given level above an incendive potential.

The circuit in FIG. 21 also has a voltage collapsing function intended to detect a slow drop in voltage during rectangular current limiting, and to isolate the power supply 6 should the voltage pass through the collapsing threshold. A slow drop in voltage may not be detected and acted upon by the window comparator because the inductor 5 will exhibit very low impedance and therefore very small voltage fluctuations, usually within the normal operating noise or signalling zone, as described above in relation to FIG. 18. Slow changes in voltage are therefore not detected, or detectable by the window comparators.

The voltage collapsing function is provided by Zener diode 45 and resistor 47. If the voltage drops below the inhibit 46, the function 48 isolates the power supply 6. Therefore, the circuit in FIG. 21 has a built in minimum permissible internal resistance that it can have under full current, which creates a minimum internal resistance Ri. For example, if the Inhibit 46 triggers shutdown at eight volts, and the current limit is set to five hundred milliamps, then the minimum internal resistance is sixteen ohms.

Figure 22:
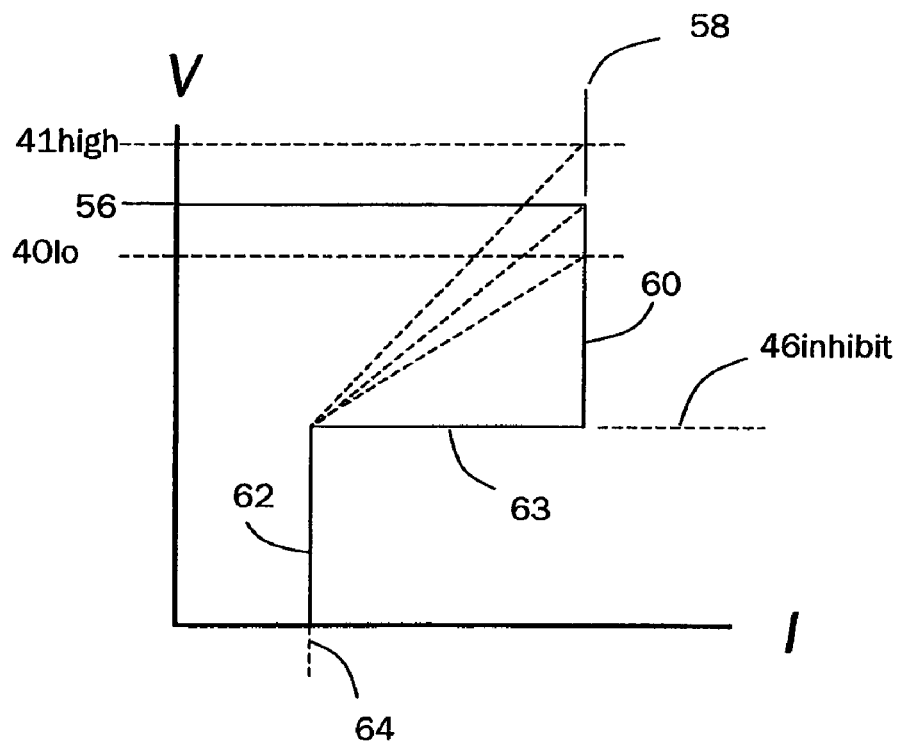
FIG. 22 is a graph showing the voltage and current properties of the electrical circuit, part of which is shown in FIG. 21.

FIG. 22 shows the voltage current relationship in the circuit shown in FIG. 21. In FIG. 22 the normal output voltage is at 56, and the slow changing current or low disturbance current can increase from zero to a maximum level 58. If it reaches that level it is rectangularly current limited, as indicated at 60, until it drops to the inhibit level 46 inhibit. It will continue to drop to a lower non incendive, or zero current, level 62. The voltage at that current is dictated by the output load characteristic. The current only returns to normal levels once the fault or load is cleared, gaining full current capacity on passing the inhibit voltage.

If an Interruption occurs during any phase above the inhibited current and/or voltage zone, which breaches the deadband defined by high 41high and low 40low trigger points, the current and/or voltage is transitioned to the zone below the inhibit 46 inhibit level in an event timed manner, as described above in relation to FIG. 21.

FIG. 22 assumes that the load is disconnected from the power supply when it drops below the inhibit voltage 46 inhibit, and that full current is supplied to the load before, or at the moment when the load is reattached. Transition between the zones is controlled in order to assist potential arc quenching, and the dotted transition lines form part of the quench action.

Figure 23:
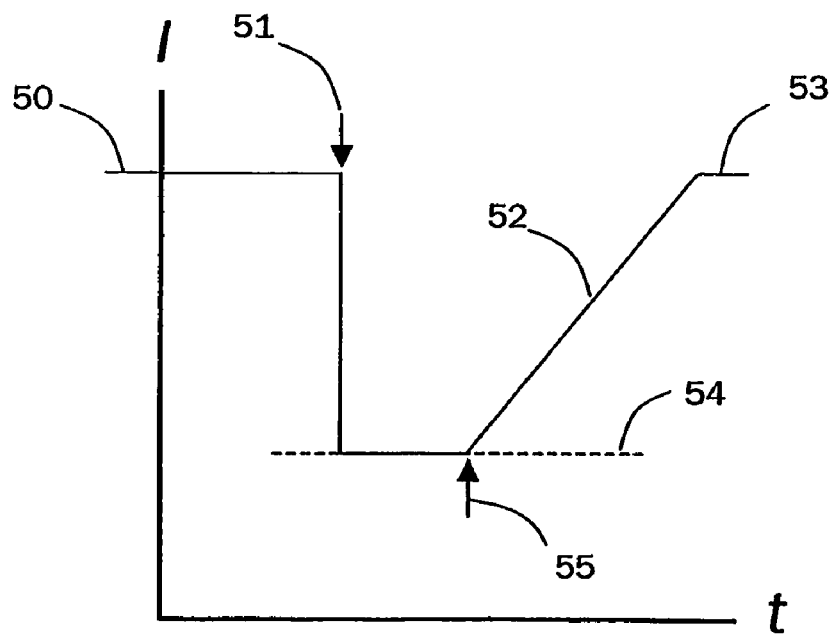
FIG. 23 is a graph showing the recovery properties of the electrical circuit, part of which is shown in FIG. 21.

FIG. 23 illustrates how the function 48 described above reconnects the power supply in a slewed manner in order to prevent the circuit inadvertently isolating the power supply during recovery.

FIG. 23 shows the current I/time t reaction to an event 51 which could be any fault in the circuit detected by the window comparator arrangement or the voltage collapsing function. From a normal current level 50, an event 51 triggers the output to fall to a current level 54 which is non-incendive. The fault probe function operates at this level, and the current level 54 will remain at this level until the fault clears. When the fault is cleared the power supply is reconnected at point 55, and it returns in a slewed manner 52 to the normal current level 53.

The slewed recovery 52 can be achieved by further series inductance, but in this case it is achieved by the control of the function generator 48. The slewed recovery 52 can be linear as shown, or it could be an exponential or similar non-linear recovery.

As described above the main advantage of the slewed recovery 52 is that is attenuates any disturbance across the reactor means so load recovery can occur without triggering any isolating event.

However, the slewed recovery 52 also restricts any energy flowing to an arc attempting to form, although if any fault occurs during recovery, or during the critical parts of recovery, it will still be detected and appropriate action taken.

The slewed recovery can be commenced when the fault is cleared, as described above, or it can be commenced after a pre-determined duration. For example, the function generator 48 can be adapted to hold the power supply at the safe level 54 for one millisecond. Such a holding period may allow for a more complete energy discharge from the system, and for a settling time for the system, following an interruption and before full power is returned. This may decrease, to a point, the probability of an incendive occurrence.

Alternatively, the slewed recovery can be integral with the fault probing action. When a fault is present the slewed recovery can be commenced and the power can increase to a non-incendive fault probe level. The power must not rise above such a level, and can either hold steady or drop and rise again such that a saw-toothed fault probing voltage and/or current is created.

Of course, the monitoring means and isolating means of the invention must be operational during the slewed recovery phase, or any part of it which is in the potentially incendive region, in order to detect potentially incendive faults.

The power supply recovery described above is governed by a constant current series element, but the reaction is not strictly an ideal constant current model. If a break-type arc forms during the constant current slewed recovery it must be detected, and this can be achieved in several ways.

An ideal constant current operation for the series element during the slewed recovery would allow the series element to take over or compensate for the added resistance created by the arc, and as such the monitoring means will not detect the fault. This is unless the voltage across the series element is also utilised for arc detection.

However, if the series element itself is adequately slewed, then any step change which is characteristic of a propagating arc will transition through the series element and will be detected. Of course, on detection of a propagating arc the series element is shut down in a timely manner, suggesting a series element slew override.

Alternatively, the series element can be adapted to slew for a negative going resistance change, but be allowed an adequately fast positive going resistance change. This would be simple to implement by those skilled in the art. This technique is conditioned by the inductance of the circuit, because an attempt at a make-type arc will be met by the circuit reactance. The series element may also be shunted by a capacitor or similar to allow a dynamic bypass of the series element. However, the capacitive value would have to be controlled, because it will bypass the shutdown ability of the series element.

Lastly, the control function 48 itself may be utilised to provide the series element directional infinite impedance slewing as describe above.

The circuit shown in FIG. 21 can be altered in various ways, for example the window comparator arrangement may comprise filtering which filters out the effect of the series element during the slewed recovery, and at any other event not characteristic of a propagating arc, but can still allow the detection of a propagating arc.

Figure 24:
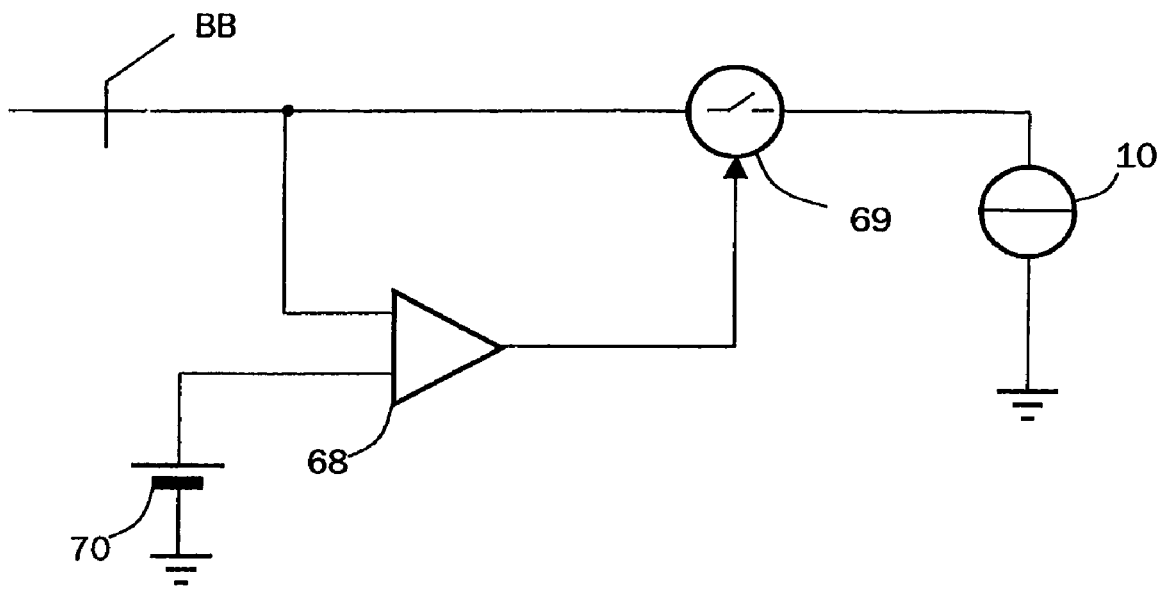
FIG. 24 is a diagrammatic view of the load end of another electrical circuit according to the present invention.

FIG. 24 shows the load end of another electrical circuit according to the invention. In FIG. 24 the load end of the electrical circuit has a simple static voltage collapsing arrangement in which the load 10 is forced to a minimum resistance by comparator 68, which compares the voltage at the input BB with a reference voltage 70. If the input voltage drops below the reference voltage, the load is isolated by means of switch 69 to a high impedance. For example, if the reference is set at ten volts, and the supply is limited to five hundred milliamps, then the minimum resistance which the load 10 can attain is twenty ohms.

Although the minimum resistance is a useful attribute for intrinsically safe current limiting during arc formation, as it supplies a constant current or infinite Impedance load, it may not be adequate for the high current and high voltages proposed. (It may be adequate in some voltage and current applications where the minimum load resistance and the power supply minimum internal resistance are high enough, and the reaction time and cable propagation times are low enough.)

However, any arc formation has a voltage which is the difference between the power supply voltage and the load side collapsing voltage. For example, if the power supply output is twenty volts, and the load collapsing voltage is ten volts, then the arc cannot attain a potential of more than ten volts, which, at approximately three amps or so, remains non-incendive.

However, in practice when an inductive interface, for example a cable, is used in the circuit the voltage across the arc can attain much higher potentials which could become incendive. Therefore, it would only be possible to rely on a non-inductive connection between the power supply and the load if they were very close to one another. Nevertheless, the power supply itself is intrinsically safe and therefore, this arrangement deviates from the prior art because the connection between the power supply and the load has no requirement for mechanical protection from shunt type short circuits.

In any event, the prime advantage of the static collapsing circuit shown in FIG. 24 is that it gives the load 10 a low interruption characteristic, so automatic connection of the load 10 during power supply recovery will not retrigger the isolating means to fully or partially isolate the power supply again. The protection circuit works in combination with the slewed recovery described above. Because the recovery is slewed, a constant load will not trigger the monitoring means to isolate the power supply until an interruption like a load with a current transitional start up reaches its transition point, which in this case is dictated by the load side collapsing circuit set at ten volts. At that transition point, the load demands the full current, or a higher current than the power supply is able to supply, and therefore the power supply voltage drops to a point where the collapsing circuit will collapse. This reduces the current demand again to the point where the power supply voltage can increase. This cycle continues until the load is fully charged.

This cycle comprises a flat plateaux, or a gradual rise, which is not typical of a potentially incendive arc. Therefore, it will not cause the monitoring means of the invention to isolate the power supply. However, any disturbance upstream of the load collapsing circuit will still cause the monitoring means to react in the normal way, and this is the case throughout the load recovery phase.

Figure 25:
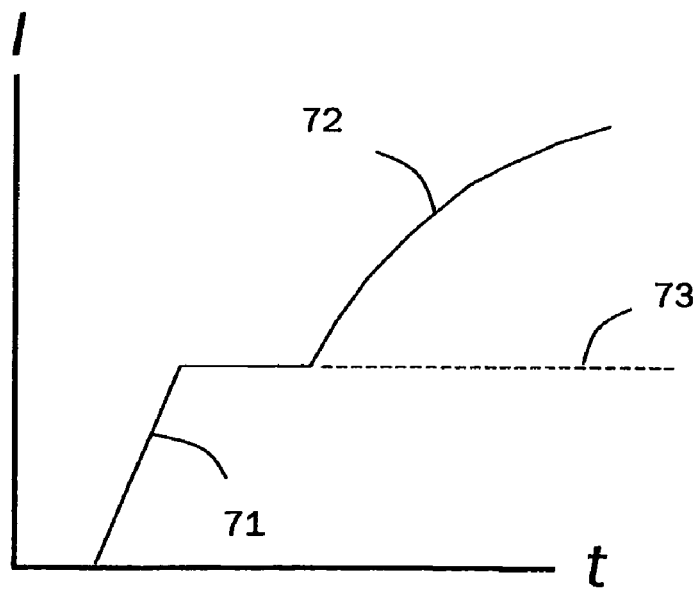
FIG. 25 is a graph showing the time-related performance of the electrical circuit as shown in FIG. 24.

FIG. 25 shows the load current transition during the slewed power supply recovery described above. The current from the power supply on recovery ramps up 71 proportional to the capacitance seen on the power supply output, until it reaches the load side static collapsing circuit collapsing voltage 73. At this plateau the current flow holds for a time proportional to any inductance which requires charging at the point of load connection. Once initially charged, the current then increases, as indicated at 72, to full current demand at a rate proportional to the supply inductance and/or the load capacitance.

Figure 26:
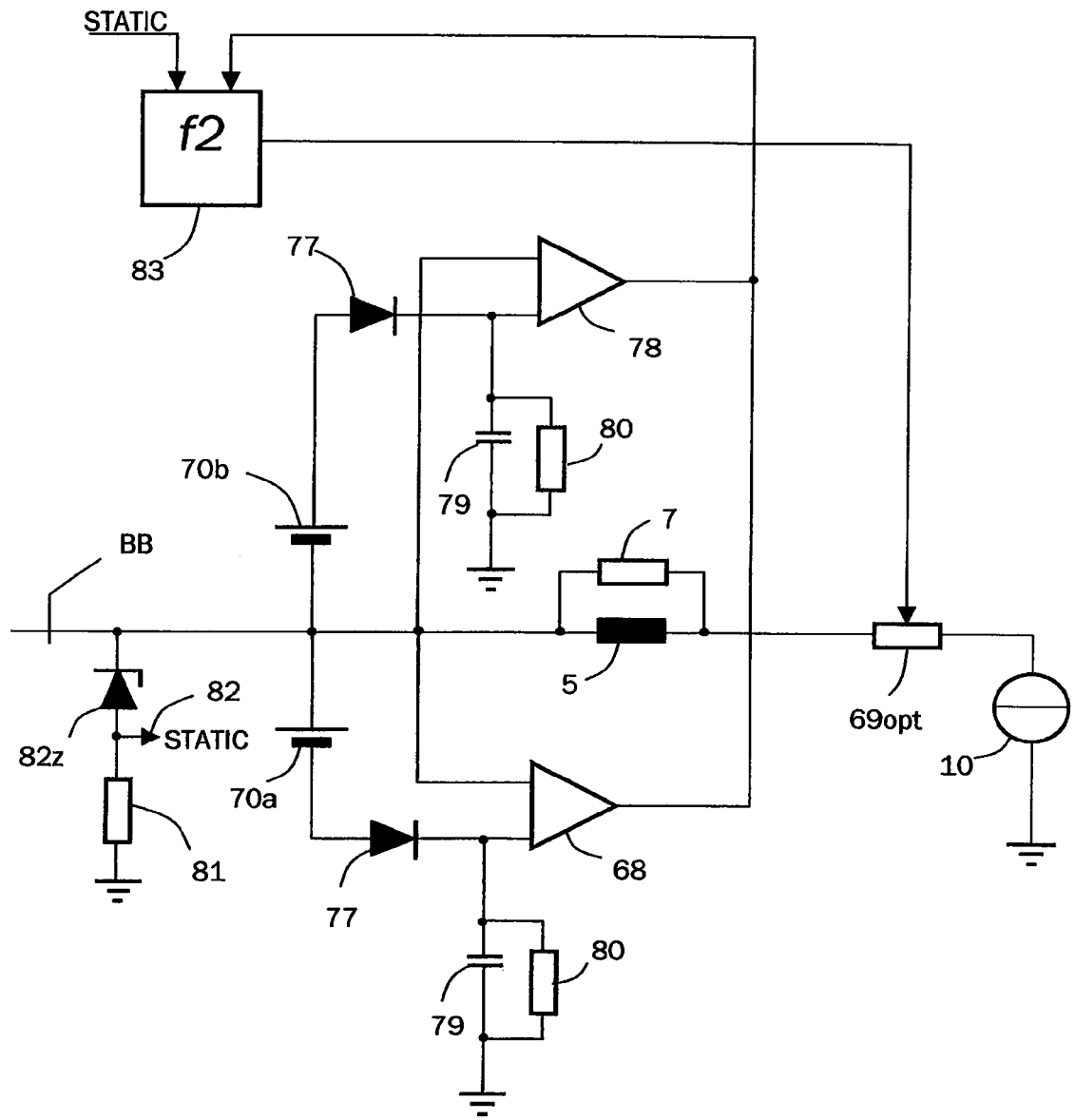
FIG. 26 is a diagrammatic view of the load end of another electrical circuit according to the present invention.

FIG. 26 shows the load side of another electrical circuit according to the present invention. The load end shown in FIG. 26 has a monitoring means, isolating means and voltage collapsing arrangement which mirrors the power supply end shown in FIG. 21, and some of the same reference numerals have been used.

A function 83 is provided and a series element 69*opt*, however there is no static current limiter, because the load end shown in FIG. 26 is intended to be used with the power supply end shown in FIG. 21, and a static current limiter is included there.

The load end shown in FIG. 26 has a static voltage collapsing threshold, indicated at 82, which comprises resistor 81 and Zener diode 82z which is set at a value above that of the power supply inhibit level for reasons described earlier.

The load end shown in FIG. 26 also has a dynamic follower detection arrangement provided by positive and negative reference 70b, 70a, which are adequately sized to perform the functions described earlier, a window comparator 68, 78 measuring voltage across inductor 5, and a rail voltage follower comprising a diode 77 and a decaying sample and hold RC circuit 79, 80. The rail voltage follower tracks the rail voltage BB and provides a threshold above and below it, so any slow deviation can be tracked and ignored, thus maintaining the position of the tracking thresholds about the rail voltage. (This is done with the caveat that an interruption at least characteristic of a propagating arc is not tracked by the tracking threshold and thus can be detected and the function 83 can isolate the load or to apply an apparent minimum load impedance such as to quench any propagating arc.)

The static collapsing voltage provides a minimum voltage level, and therefore a minimum loop resistance. If the effect of an arc under low current flow is not detected, the low current of the loop (which includes any power supply minimum resistance and any load series resistance), restricts the power to the arc, and sustains it at a reduced voltage. For example, if an arc has a potential of eight volts, while it still exists, the incendive potential at, say, one hundred milliamps, is eliminated.

Therefore, it is possible that in lower current situations the monitoring means may not be required, provided the static limitations are adequately adjusted and the arc is restricted in voltage potential and/or current so it is has no chance, or a very low probability, of becoming incendive.

The above described dynamic follower detection could also be used at the power supply end to account for any deviation in voltage and/or current and/or the recovery ramp.

It will be appreciated that all the above described power supply end and load end arrangements must be able to react to a fault fast enough to quench a non-incendive arc before it can become incendive, as this is an essential feature of the invention.

Figure 1:
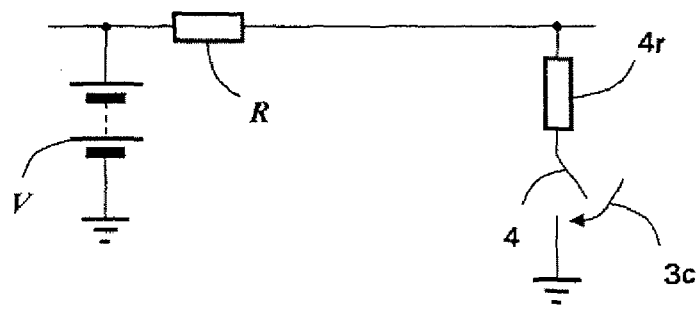
FIG. 1 is a diagrammatic view of a prior art intrinsically safe electrical circuit.
Figure 2:
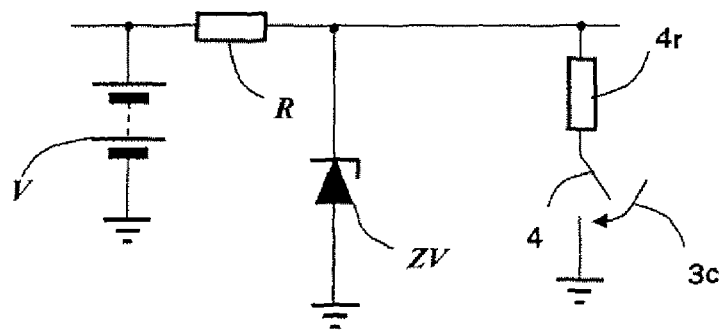
FIG. 2 is a diagrammatic view of another prior art intrinsically safe electrical circuit.
Figure 3:
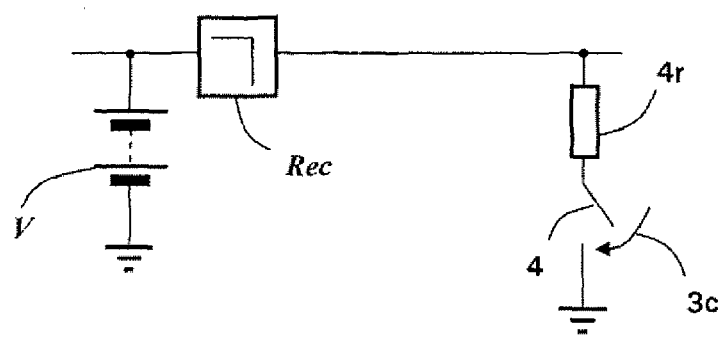
FIG. 3 is a diagrammatic view of another prior art intrinsically safe electrical circuit.
Figure 4:
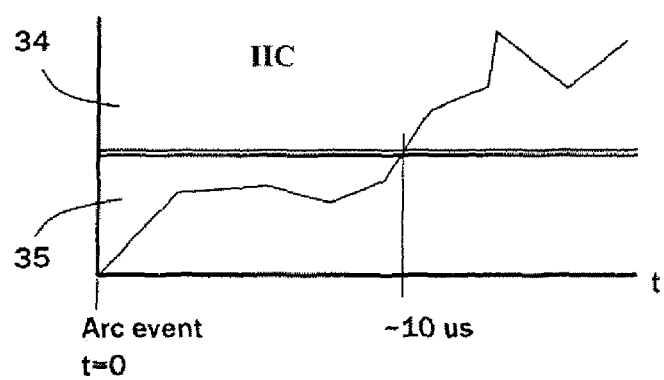
FIG. 4 is a graph showing the propagation properties of an arc.

As shown in FIG. 4, and as described above, a propagating arc will remain non-incendive for about 10 microseconds, and any circuit according to the invention must be able to quench an arc before it becomes incendive. In order to achieve this various factors must be considered.

The key consideration is the length of the cable between the power source and the load. The cable must be short enough such that any fault can be detected and appropriately dealt with by either the monitoring and isolation means at the power supply end, or the monitoring and isolation means at the load end.

Figure 27:
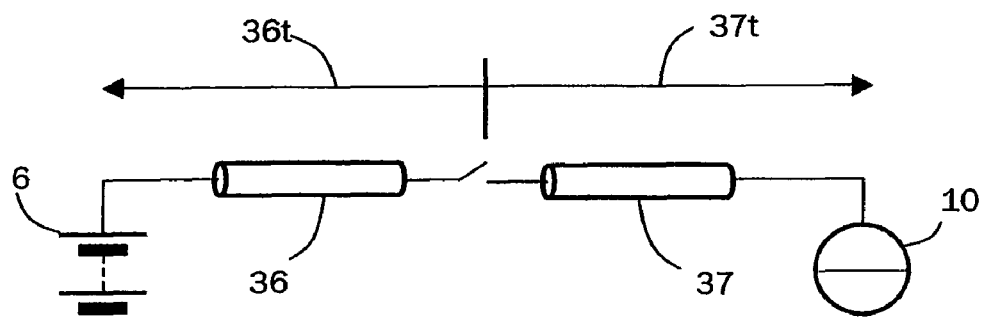
FIG. 27 is a diagrammatic view of a fault occurrence at a point along a cable in another electrical circuit according to the present invention.

FIG. 27 shows a basic electrical circuit according to the invention, in which the cable is of such a length that a fault event at its centre can be detected and dealt with by monitoring and Isolation means at a power supply end and a load end.

The fault event takes a given time 36*t* to traverse along the power supply end half of the cable 36, and a given time 37*t* to traverse along the load end half of the cable 37. The propagation times 36*t* and 37*t* are similar if the fault is at the centre of the cable, but obviously the times are different if the fault is at any other point. If the fault is nearer to the power supply 6, then the power supply end monitoring means will detect the fault interruption before the load end monitoring means, and therefore it will react to the fault quicker.

The worst place for a fault is at the centre of the cable, because the reaction times of the isolation means at either end of the circuit are at their maximum, so the fault will have the greatest incendive potential possible.

The invention also includes embodiments in which only the power supply end is provided with monitoring means and isolation means. If such a version were used the cable would have to be approximately half the length shown in FIG. 27, because the power supply end monitoring means and isolation means must not allow an incendive arc to form at any point up to the far end of the cable, where the propagation time will be at its maximum.

Of course, the power supply end monitoring and isolating means, and the load end monitoring and isolating means can be any of those arrangements described above.

Figure 28:
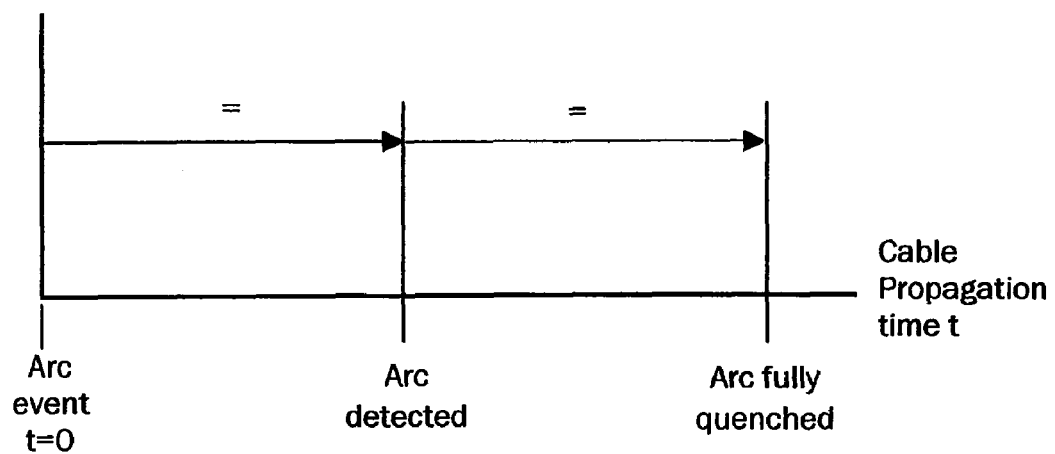
FIG. 28 is a graph showing the arc detection and quench timeline in the electrical circuit shown in FIG. 27.

As shown in FIG. 28, the cable propagation time must include the period from the event to detection, and the period from the isolation event to quench. In FIG. 28 the time between each event is equal, however in practice this may not be the case because the incendive arc energy may be limited to the voltage across it and the supply voltage and current, which during the quenching phase, may fall in a linear or an exponential way. It is known that at approximately ten to twelve volts an arc has at least half the incendive potential it has at twenty or twenty four volts respectively.

It will be appreciated that it is not merely the length of a cable which must be considered, but all its physical characteristics, and in particular the fault current which can be carried in it. This is because the current dictated inductive energy stored in a cable and the supply current fed to an arc, dictates the energy dissipated in an arc. The cable is more complex than a simple distributed inductor because it also has a capacitive element that also stores energy, proportional to the voltage. The cable comprises a damped second order system in which the damping is created by the cable resistance and any parasitic elements. All of this must be taken into account.

It is possible to mathematically model an electrical circuit according to the invention to ensure it will function, but computerised simulation or physical hardware testing using a real cable are more acceptable tests to provide accepted empirical data.

Once the length, or size, of a cable and the voltage and current it carries have been defined, then the rest of the circuit must be designed to define the remaining parameters, in particular the circuit reaction time and all the set point values. Of course, the model can begin with cable length, and the rest of the calculations can be applied accordingly. If the outcome of tests can be made repeatable, then empirical data can be provided, however initial testing to well known standards concerning spark test apparatus and/or oscillograph data, should be adequate.

There are further fault scenarios which are not discussed above, but which are possible with the circuits of the invention. However the likelihood of an occurrence of these types of fault is so low they can safely be discounted, or the circuits will inherently be able to deal with them.

One fault scenario would comprise an arc resistance which exactly matches the load resistance at a given time, and would require the static collapsing voltage to be just above the collapsing voltage, so the current through the arc, when it is attached across the cable, is diverted wholly into the arc without detection. The collapsing voltage would then be breached thus Isolating the load. This arc must be set up on its first strike.

However, this fault would only be a make-type arc, which would be a less common occurrence than a break type arc, and on an inductive cable circuit such make-type arcs are not prone to elevated break arc voltages.

In addition, the arc must be perfectly matched, and would therefore be limited to, for example the collapsing circuit lift off voltage of ten or twelve volts. At ten to twelve volts, the current may be allowed to increase to a much higher level, but that may not be possible in view of the power supply current restriction. On arc development, the voltage across it will try to increase, but when the collapsing circuit lift off voltage is reached the current will be shunted into the load and/or the load capacitance or reservoir capacitance as described earlier. A break in the load connection after the arc has formed could occur but this would be a very improbable double fault, and the arc striking as a shunt and maintaining a perfectly matched resistance on, and from, its first strike, is also a very low probability, and as such can be discounted.

Another fault scenario could occur if a high resistance oxide layer formed across the power rails without detection, at for example one million ohms. This could then fall slowly over time, without detection, to a precise incendive resistance of between forty-eight ohms, the point at which a twenty-four volt, five-hundred milliamp power supply would be isolated, and one hundred and thirty-eight ohms, where the resistance of the oxide layer would form a linear current limited non-incendive circuit. This circuit could be incendive but there would need to be a lower oxide resistance limit of approximately one hundred ohms, and the only incendive occurrence could be a first and only break that has to be a sustainable incendive arc strike, and which has to be in an incendive atmosphere, based on zone one arguments. Therefore, this fault scenario is very improbable, and is at least as unlikely as one thousand to one according to arc formation statistics. Of course, further low impedance resistance probing may be able to detect such faults and shut the system down, and this may be useful for certain applications.

Figure 29:
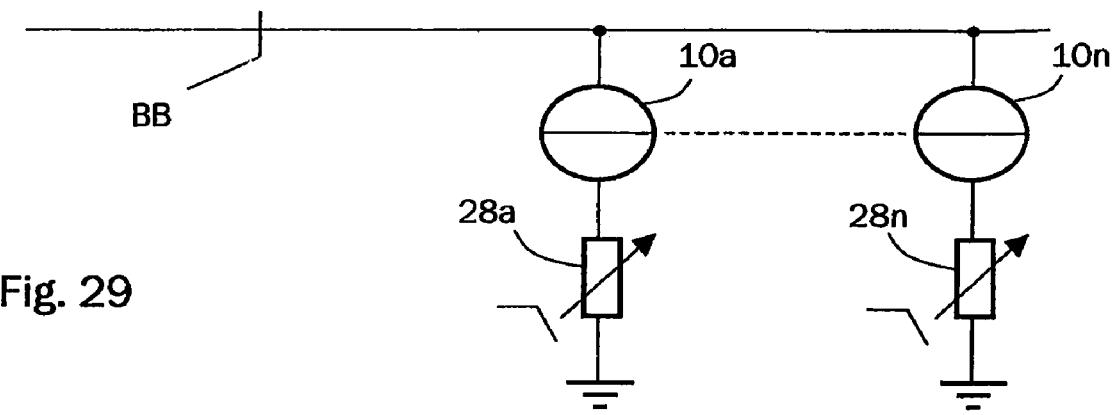
FIG. 29 is a diagrammatic view of the load end of another electrical circuit according to the present invention.

The electrical circuits described above can be altered or added to as required to make them work in practice. For example, more than one load can be connected to an electrical circuit. FIG. 29 shows the load end of another electrical circuit according to the present invention, in which two or more loads 10*a* to 10*n* are connected to the circuit. Each load has a series element 28*a* to 28*n* respectively, because each load must be restricted to a particular current for safety. (For example, the power supply may have a rating of twenty-four volts and two amps, whereas the load, in accordance with IEC61158-2, may only accept two hundred and fifty milliamps. Therefore, further current limiting between the power supply and the load is required.) The series elements 28a to 28n have a conventional rectangular current limiting function.

Therefore, the loads 10a to 10n are intrinsically safe in a conventional manner, autonomous of the rest of the system.

However, with this arrangement the series elements 28a to 28n can be used collectively to fully or partially isolate the loads 10a to 10n as described above in relation to series element 28 shown in FIG. 15.

(The loads 10a to 10n, or any other loads, could be restricted in any known way to meet any known requirements for intrinsically safe systems, all distinct from the rest of the system. For example, at twenty-four volts empirical testing may demonstrate that for a gas group IIC environment, the current should be restricted, in a rectangular way, to fifty milliamps, whereas for linear current restriction the short circuit current may safely be restricted to one hundred and seventy four milliamps. The rectangular current limit elements 28a to 28n may also be substituted by linear elements, for example infallible resistors, or they may comprise other non-linear functions, for example foldback current limiting. Furthermore, current limiting at a given voltage may be required to match the power to the load. For example, at twenty-four volts and fifty milliamps the power supplied to a device is one point two watts, which is the required maximum for an intrinsically safe power source supplying gas group IIC loads.

In addition, testing has shown that a slewed output recovery and/or an adequate isolated hold period, will exhaust the cable and the device stored energy and/or allow an increase in the amount of energy that can be supplied to a fault, thus extending the range by approximately fifty percent above the ignition curves for a given gas group. For example, it is possible to attain a level of around fifty milliamps to seventy five milliamps at twenty-four volts for gas group IIC. Nevertheless, the power matching to a device is a further parameter consideration, for example fifty milliamps at twenty-four volts will give an output power of one point two watts, which is the limit for conventional entity instrumentation. The trigger may also include a forced off state in a similar way that the power supply may react, thus increasing the output capacity if required. Finally, the current control to a device may include infallible resistance, which will restrict the energy still further and may assist the performance of the rectangular current limit by way of reducing the source voltage and/or power proportional to the resistance and the current.)

Figure 30:
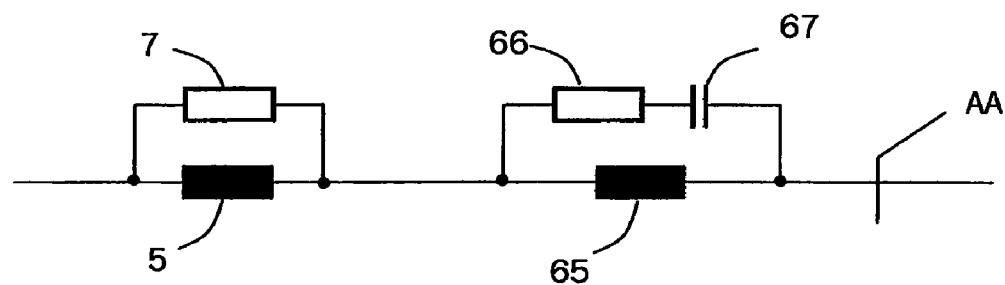
FIG. 30 is a diagrammatic view of the power supply end of another electrical circuit according to the present invention.

The invention can be used in practice with a Fieldbus system, for example a two or four wire IEC61158-2 application or similar, or with a two or four wire Ethernet or Power Over Ethernet application or similar. In such arrangements various factors must be considered, for example an IEC61158-2 Fieldbus application for an electrical circuit according to the invention requires a power conditioner that may be active or passive. FIG. 30 shows the power supply end of another electrical circuit according to the present invention in which a passive power conditioner comprising an inductor 65 of between two and six milliHenries is added to the power supply, downstream of the monitoring means 5 and 7. (It could also be upstream of the monitoring means 5 and 7.) The monitoring and isolating of the power supply is sufficiently unaffected by the power conditioner.

(In an alternative to the electrical circuit shown in FIG. 30, the power conditioner itself may form part of the reactor means of the invention, because it has the same characteristic response to a potentially incendive arc as the previously described inductors.)

The power conditioner inductor 65 could filter out the effect of arc characteristics if it were used on its own, so a shunt terminator comprising resistor 66 and capacitor 67, which is normally used for Fieldbus loading, is employed to offer a high frequency shunt across the power conditioner. This provides an effective one hundred ohms, or similar, shunt resistance that will not lead to impractical attenuation to a characteristic arc signal. A shunt terminator is used as opposed to a conventional 'across the rail' terminator because the current leading into a fault must pass through the terminator 66, 67 and therefore it must be measurable by any static current detection or dynamic detection circuit, and because the capacitor 67 has a very low energy stored in it. Of course, placing the terminator in front of the static and/or dynamic current control has the same effect, but this then places the power conditioner in front of the terminator, which may create measurement difficulties.

In Ethernet applications, any Ethernet devices connected to the circuit must not interfere with the detection methods. Further, in such applications it may only be necessary to use a voltage collapsing arrangement, as shown in FIG. 15, at the load end because the cable lengths for Ethernet are short enough, in terms of propagation time, for a power supply end monitoring and isolation means to fully or partially isolate the power supply in the event of any fault without the need for the same to be done dynamically at the load end. Of course, the full monitoring and isolating means as shown in FIG. 19 or 26 could be utilised if desired.

Practical circuits may also have other additional features or elements to those described above which may affect the operational requirements described above. Obviously the mandatory requirements for any circuits which contain additional features, is that the circuits must be designed so the additional features do not adversely contribute in any way to the potentially incendive fault, undetected or otherwise, such that the fault becomes incendive or potentially incendive.

Figure 31:
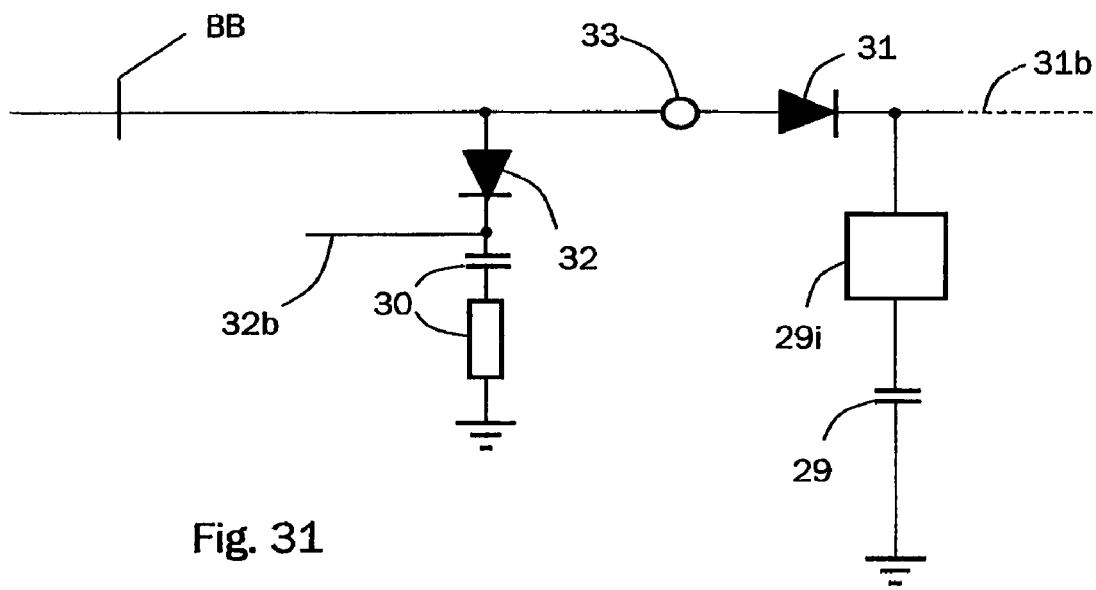
FIG. 31 is a diagrammatic view of the load end of another electrical circuit according to the present invention.

An example of such a feature is shown in FIG. 31, which shows the load end of another electrical circuit according to the present invention. A Fieldbus terminator 31 is provided, which could inject current into the cable and/or fault if it were positioned in an unprotected, undetected or an uncontrolled point in the circuit. This is prevented here by providing a series blocking diode 32, which is biased 32b for signal conduction.

Clearly, any additional features also must not impede the adequate detection of any faults, in that they must not prevent the monitoring means at the power supply end or the load end from adequately operating in the manner described above. For example, an event pulse traversing the cable must not be damped to a degree where it cannot be detected, or is adversely delayed.

FIG. 31 also shows a capacitive reservoir element 29 which is used for load brown out protection during power supply or load protection reaction events to a fault or a similar momentary loss. Again, the circuit is protected from the capacitance by blocking diode 31, and the damping effect of the capacitor 29 is isolated 29i from the rest of the circuit.

Therefore any interruption characteristics traversing along the cable caused by any fault remains adequately detectable, because the capacitor 29 is prevented from dampening a positive going pulse caused by a downstream fault on a cable supplying another load. The isolation 29i could comprise an inductance which is designed to saturate at the current demand made by the load, but not saturate during normal operation, or it may comprise an electronic gyrator or similar.

(The above arguments would be false if the load 10 and/or the cable are capacitive and the total capacitance is not necessarily protected from influence by said isolation 29, despite the presence of the blocking diode 31. If that were the case, a monitoring means would be needed which is not effected by the capacitive load damping effects.)

There may also be the requirement in use to disconnect the load, as shown at 33, leaving the terminator 30 in place. However, the terminator does not significantly affect any fault characteristic traversing along the cable. Testing has demonstrated that, for gas group IIC, the effective clamping resistance or impedance may be as low as thirty-five ohms and therefore a one hundred ohms terminator will not lead to adverse damping.

Of course, if there are a number of loads connected to the circuit with the arrangement shown in FIG. 31, the number will be restricted by the total damping influence of all the protection systems. The total damping influence must not prevent any fault being detected.

Any practical circuit according to the invention will have to meet the requirements of the appropriate standards, which may stipulate that redundancy systems are included, or that some components must be infallible, which is to say that they will only fail safely or that they can only be stressed at two thirds of their rating in a fault condition.

All the examples described above are simple systems intended to demonstrate the invention, however to qualify as an intrinsically safe system countable faults or component parts must be made redundant where required. The component orientation, and position or relationship with other components may be exchangeable in order to achieve this. For example a series element may be upstream and/or downstream of a series inductor or it may shunt a series inductor where any benefits of such minor orientation or relational changes can easily be understood and implemented by persons skilled in the art. Other functions may share components or replicate components of a similar type. For example, a system for functional purposes may only require one set of components whereas two or more may be required for intrinsic safety. Sensing components may comprise inductors that are infallible both physically and electrically, and saturation currents may be taken into account.

Further, some passive circuits described above may be replicated and/or replaced by active equivalents. In addition voltage detection and reaction may replace or compliment current detection and reaction, or they may be intermeshed. The prime reference documents for intrinsically safe systems are the European intrinsically safe standard or equivalent EN50020, the PTB Report W53 and the physical layer Fieldbus standard IEC61158-2. Further data on continuous interruption, CIS, can be obtained from the Physikalisch-Technishe Bundesanstalt.

It will also be appreciated that any of the above described features can be replaced with equivalent alternatives. In addition to the alternatives already mentioned above, there are known alternatives to the comparators which can be used with the invention. In addition, the functions of the "function generators" described above may be dispersed among other features of the circuits. For example, slewing may be attained by the use of a resistor, or a high resistance feeding the gate of a high input capacitance MOSFET isolating series element.

The invention claimed is:

1. An electrical circuit comprising a power supply, a load and an incendive arc prevention means comprising a monitoring means and an isolation means,
   in which the monitoring means monitors the electrical circuit by means of a reactor means,
   in which if a short circuit with the potential to cause an incendive arc occurs in the electrical circuit the reaction of the reactor means is detected by the monitoring means and the isolation means fully or partially isolates the power supply from said short circuit, such that an incendive arc cannot develop from said short circuit,
   in which if an event with a current and/or voltage pattern which is characteristic of a propagating non-incendive arc occurs in the electrical circuit between the power supply and the load, the reaction of the reactor means is detected by the monitoring means, and the isolation means fully or partially isolates the power supply from said event, such that said propagating non-incendive arc cannot become an incendive arc.

2. An electrical circuit as claimed in claim 1 in which said monitoring means and said isolation means are disposed at the power supply end of the electrical circuit, and in which the incendive arc prevention means further comprises a load end monitoring means and a load end isolation means.

3. An electrical circuit as claimed in claim 2 in which the load end isolation means fully or partially isolates the load from the electrical circuit if the voltage drops below a predetermined threshold.

4. An electrical circuit as claimed in claim 2 in which if an event with a current and/or voltage pattern which is characteristic of a propagating non-incendive arc occurs in the electrical circuit between the power supply and the load, the load end monitoring means detects it and the load end isolation means fully or partially isolates the load from said event.

5. An electrical circuit as claimed in claim 4 in which the electrical circuit is provided with a non-incendive fault probe circuit, in which if the power supply and the load are fully or partially isolated in use, the non-incendive fault probe circuit passes non incendive level current and/or voltage into the electrical circuit, and in which the non-incendive fault probe circuit is adapted to remove the full or partial isolation of the power supply when resistance in the electrical circuit rises above that at which a short circuit would be present.

6. An electrical circuit as claimed in claim 5 in which if a short circuit with the potential to cause an incendive arc, or an event with a current and/or voltage pattern which is characteristic of a propagating non-incendive arc occurs in the electrical circuit, the power supply end isolation means fully isolates the power supply, and in which the non-incendive fault probe circuit is powered by a second power supply different from the electrical circuit power supply.

7. An electrical circuit as claimed in claim 5 in which if a short circuit with the potential to cause an incendive arc, or an event with a current and/or voltage pattern which is characteristic of a propagating non-incendive arc occurs in the electrical circuit, the power supply end isolation means partially isolates the power supply to a non-incendive level, and in which the non-incendive fault probe circuit is powered by said partially isolated power supply.

8. An electrical circuit as claimed in claim 4 in which the electrical circuit is provided with recovery control means, in which after a fault has ended the recovery control means energizes the electrical circuit gradually over a time period sufficient to prevent the power supply end monitoring means and/or the load end monitoring means interpreting the energising of the electrical circuit as an event with a current and/or voltage pattern which is characteristic of a propagating non-incendive arc.

9. An electrical circuit as claimed in claim 8 in which the recovery control means comprises a function generator which directly or indirectly variably adjusts the output voltage and/or current of the power supply.

10. An electrical circuit as claimed in claim 4 in which the power supply end monitoring means and isolation means and the load end monitoring means and isolation means are spaced apart by such a distance that they can detect an event with a current and/or voltage pattern which is characteristic of a propagating non-incendive arc and fully or partially isolate the power supply such that an incendive arc cannot form, in less time than an incendive arc can form at any point in the electrical circuit between them.

11. An electrical circuit as claimed in claim 4 in which the power supply end monitoring means and isolation means and the load end monitoring means and isolation means are spaced apart by such a distance that each one can detect an event with a current and/or voltage pattern which is characteristic of a propagating non-incendive arc and fully or partially isolate the power supply or the load such that an incendive arc cannot form, in less time than an incendive arc can form in the electrical circuit between their location and a mid point between their locations.

12. An electrical circuit as claimed in claim 1 in which the power supply end monitoring means and isolation means does not fully or partially isolate the power supply from the electrical circuit when noise or signalling is detected within a deadband about a mean current or voltage level.

13. An electrical circuit as claimed in claim 4 in which the load end monitoring means and isolation means does not fully or partially isolate the load from the electrical circuit when noise or signalling is detected within a deadband about a mean current or voltage level.

14. An electrical circuit as claimed in claim 1 in which the reactor means is an active electronic gyrator adapted to emulate inductor behaviour.

15. An electrical circuit as claimed in claim 1 in which the reactor means is a resistor, and reaction of the resistor to a short circuit which is detected by the monitoring means is a voltage change generated across the resistor.

16. An electrical circuit as claimed in claim 1 in which the reactor means is an inductor, and reaction of the inductor to a short circuit which is detected by the monitoring means is a voltage change generated across the inductor.

17. An electrical circuit as claimed in claim 16 in which a shunt resistor is connected across the inductor.

18. An electrical circuit as claimed in claim 16 in which the power supply end monitoring means and isolation means comprises a positively referenced comparator means and/or a negatively referenced comparator means, in which the output of the positively referenced comparator means and/or the negatively referenced comparator means is used to fully or partially isolate the power supply from the electrical circuit.

19. An electrical circuit as claimed in claim 18 in which a positively referenced comparator and a negatively referenced comparator are used, and in which the positively referenced comparator and the negatively referenced comparator are referenced to the source voltage.

20. An electrical circuit as claimed in claim 3 in which the load end monitoring means and isolation means comprises a voltage collapsing arrangement comprising a comparator referenced to a reference voltage, in which the output of the comparator is used to fully or partially isolate the load from the electrical circuit.

21. An electrical circuit as claimed in claim 4 in which the load end monitoring means monitors the electrical circuit by means of a reactor means.

22. An electrical circuit as claimed in claim 21 in which the reactor means of the load end monitoring means is an active electronic gyrator adapted to emulate inductor behaviour.

23. An electrical circuit as claimed in claim 21 which the reactor means of the load end monitoring means is a resistor, and reaction of the resistor to a short circuit which is detected by the load end monitoring means is a voltage change generated across the resistor.

24. An electrical circuit as claimed in claim 21 which the reactor means of the load end monitoring means is an inductor, and reaction of the inductor to a short circuit which is detected by the load end monitoring means is a voltage change generated across the inductor.

25. An electrical circuit as claimed in claim 24 in which a shunt resistor is connected across the inductor.

26. An electrical circuit as claimed in claim 24 in which the load end monitoring means and isolating means comprises a positively referenced comparator means and/or a negatively referenced comparator means, in which the output of the positively referenced comparator means and/or a negatively referenced comparator means is used to fully or partially isolate the load from the electrical circuit.

27. An electrical circuit as claimed in claim 26 in which a positively referenced comparator and a negatively referenced comparator are used, and in which the positively referenced comparator and the negatively referenced comparator are referenced to the incoming voltage.

28. An electrical circuit as claimed in claim 27 in which the positively referenced comparator and/or the negatively referenced comparator of the load end monitoring means and isolating means are adapted to ignore DC or low frequency incoming voltage variations by means of a slewing means and/or a filtering means.

29. An electrical circuit as claimed in claim 8 in which the recovery control means further comprises a function generator which directly or indirectly variably adjusts the input voltage and/or current to the load.

30. An electrical circuit as claimed in claim 1 in which the load comprises one or more load devices and/or circuits.

31. An electrical circuit as claimed in claim 30 in which each of the one or more load devices and/or circuits is provided with its own monitoring means and isolation means.

* * * * *

UNITED STATES PATENT AND TRADEMARK OFFICE
CERTIFICATE OF CORRECTION

PATENT NO.         : 7,876,544 B2                                             Page 1 of 1
APPLICATION NO.    : 11/631460
DATED              : January 25, 2011
INVENTOR(S)        : Michael Kessler et al.

It is certified that error appears in the above-identified patent and that said Letters Patent is hereby corrected as shown below:

Column 17, line 55, after "arc" delete ",".
    Column 18, line 22, "thus Isolating" should read --thus isolating--.
    Column 18, line 29, "for example the collapsing" should read --for example, the collapsing--.
    Column 18, line 43, "formed" should read --forms--.
    Column 19, line 35, after "period" delete ",".
    Column 19, line 66, "power supply is" should read --power supply are--.
    Column 20, line 9, after "loading" delete ",".
    Column 20, line 38, after "features" delete ",".
    Column 21, line 21, "Influence" should read --influence--.
    Column 23, line 30, "does not fully" should read --do not fully--.
    Column 23, line 34, "means does not fully" should read --means do not fully--.
    Column 23, line 53, "comprises" should read --comprise--.
    Column 24, line 7, "comprises" should read --comprise--.
    Column 24, line 18, "claim 21 which" should read --claim 21 in which--.
    Column 24, line 23, "claim 21 which" should read --claim 21 in which--.
    Column 24, line 31, "comprises" should read --comprise--.

Signed and Sealed this
Tenth Day of April, 2012

David J. Kappos
*Director of the United States Patent and Trademark Office*